(12) United States Patent
Funk

(10) Patent No.: US 7,395,131 B2
(45) Date of Patent: Jul. 1, 2008

(54) METHOD FOR PROCESSING DATA BASED ON THE DATA CONTEXT

(75) Inventor: Merritt Funk, Austin, TX (US)

(73) Assignee: Tokyo Electron Limited (JP)

( * ) Notice: Subject to any disclaimer, the term of this patent is extended or adjusted under 35 U.S.C. 154(b) by 438 days.

(21) Appl. No.: 11/057,422

(22) Filed: Feb. 15, 2005

(65) Prior Publication Data

US 2005/0165731 A1 Jul. 28, 2005

Related U.S. Application Data

(63) Continuation of application No. PCT/US03/25479, filed on Aug. 14, 2003.

(60) Provisional application No. 60/404,412, filed on Aug. 20, 2002.

(51) Int. Cl.
  *G06F 19/00* (2006.01)
  *G06F 11/30* (2006.01)
  *G05B 13/02* (2006.01)
  *G05B 15/00* (2006.01)

(52) U.S. Cl. .......................... 700/108; 700/51; 700/83; 700/96; 700/121; 702/83; 702/182

(58) Field of Classification Search ......... 700/108–110, 700/121, 51, 83, 96; 702/81–84, 182, 184; 707/203, 204; 709/201, 203

See application file for complete search history.

(56) References Cited

U.S. PATENT DOCUMENTS

| | | | | |
|---|---|---|---|---|
| 5,586,059 | A | * | 12/1996 | Oshelski et al. ............... 702/84 |
| 5,751,581 | A | * | 5/1998 | Tau et al. .................... 700/115 |
| 5,754,451 | A | * | 5/1998 | Williams ................... 702/185 |
| 5,862,054 | A | * | 1/1999 | Li .............................. 700/121 |
| 6,438,441 | B1 | * | 8/2002 | Jang et al. ................... 700/121 |
| 6,459,949 | B1 | * | 10/2002 | Black et al. ................. 700/121 |

OTHER PUBLICATIONS

"SEMI Draft Doc. #2783B, Human Interface Standard for Semiconductor Manufacturing," SEMI (Semiconductor Equipment and Materials International), p. 1-14, (1999).
"SEMI E-95-1101, Specification for Human Interface for Semiconductor Manufacturing Equipment," SEMI (Semiconductor Equipment and Materials International), p. 1-15, (2000, 2001).
"Strategic Cell Controller (SCC) User-Interface Style Guide 1.0," SEMATECH Technology Transfer 92061179A-ENG, 215 pp, (1996).

* cited by examiner

*Primary Examiner*—Sean P Shechtman

(57) ABSTRACT

A method for managing collected data in a semiconductor processing environment. The collected data can include: raw data collected during a process, trace file data received during a process, and process log file data received during a process. The raw data is synchronized with the trace file data and process log file data to create wafer data and summary data, and a file is created containing the wafer data and the summary data.

23 Claims, 25 Drawing Sheets

FIG. 21E

METHOD FOR PROCESSING DATA BASED ON THE DATA CONTEXT

CROSS-REFERENCE TO RELATED APPLICATIONS

This is a continuation of International Patent Application No. PCT/US03/25479, filed Aug. 14, 2003, which is based on and claims the benefit of U.S. Provisional Application No. 60/404,412, filed Aug. 20, 2002, the entire contents of both of which are incorporated herein by reference in their entireties.

The present application is related to co-pending applications U.S. Provisional Application No. 60/368,162, entitled "Method For Interaction With Status and Control Apparatus", filed on Mar. 29, 2002; U.S. Provisional Application No. 60/374,486, entitled "Method and Apparatus for Simplified System Configuration", filed on Apr. 23, 2002; U.S. Provisional Application No. 60/383,619, entitled "Method and Apparatus For Monitoring Tool Performance", filed on May 29, 2002; and U.S. Provisional Application No. 60/393091, entitled "Method for Dynamic Sensor Configuration and Runtime Execution", filed on Jul. 3, 2002. Each of these applications is herein incorporated by reference in its entirety.

FIELD OF THE INVENTION

The present invention is related to semiconductor processing systems, particularly to semiconductor processing systems which can manage data.

BACKGROUND OF THE INVENTION

Computers are generally used to control, monitor, and initialize manufacturing processes. A computer is ideal for these operations given the complexities in a semiconductor manufacturing plant from the reentrant wafer flows, critical processing steps, and maintainability of the processes. Various input/output (I/O) devices are used to control and monitor process flows, wafer states, and maintenance schedules. A variety of tools exist in a semiconductor manufacturing plant to complete these complicated steps from critical operations such as etching, to batch processing, and inspections. Most tool installations are accomplished using a display screen that is part of the graphical user interface (GUI) of a control computer containing the installation software. Installation of a semiconductor processing tool is a time consuming procedure.

Semiconductor processing facilities require constant monitoring. Processing, conditions change over time with the slightest changes in critical process parameters creating undesirable results. Small changes can easily occur in the composition or pressure of an etch gas, process chamber, or wafer temperature. In many cases, changes of process data reflecting deterioration of processing characteristics cannot be detected by simply referring to the process data displayed.

Facility control is often performed by a number of different control systems having a variety of controllers. Some of the control systems may have man-machine interfaces such as touch screens, while others may only collect and display one variable such as temperature. The monitoring system must be able to collect data tabulated for the process control system. The data collection of the monitoring system must handle univariate and multivariate data, the analysis and display of the data, and have the ability to select the process variables to collect. Various conditions in a process are monitored by different sensors provided in each of the process chambers, and data of the monitored conditions is transferred and accumulated in a control computer.

SUMMARY OF THE INVENTION

This invention is a method for managing data in a semiconductor processing environment. Raw data is collected during a process. Also, trace file data and process log file data are received. The raw data is synchronized with the trace file data and process log file data to create wafer data Summary data is calculated from the raw data and a file is created containing the wafer data and the summary data.

BRIEF DESCRIPTION OF THE DRAWINGS

The accompanying drawings, which are incorporated in and constitute a part of the specification, illustrate various embodiments of the invention, and together with the general description given above and the detailed description of the embodiments given below, serve to explain the principles of the invention. A more complete appreciation of the invention and many of the attendant advantages thereof will become readily apparent with reference to the following detailed description, particularly when considered in conjunction with the accompanying drawings, in which:

FIGS. 19A-19C show exemplary views of principal component analysis (PCA) plan panels in accordance with one embodiment of the present invention;

FIGS. 20A-20C show exemplary views of partial least squares (PLS) plan panels in accordance with one embodiment of the present invention; and FIGS. 21A-21E show exemplary views of file output plan panels in accordance with one embodiment of the present invention

DETAILED DESCRIPTION OF DISCLOSED EMBODIMENTS

Figure 1:
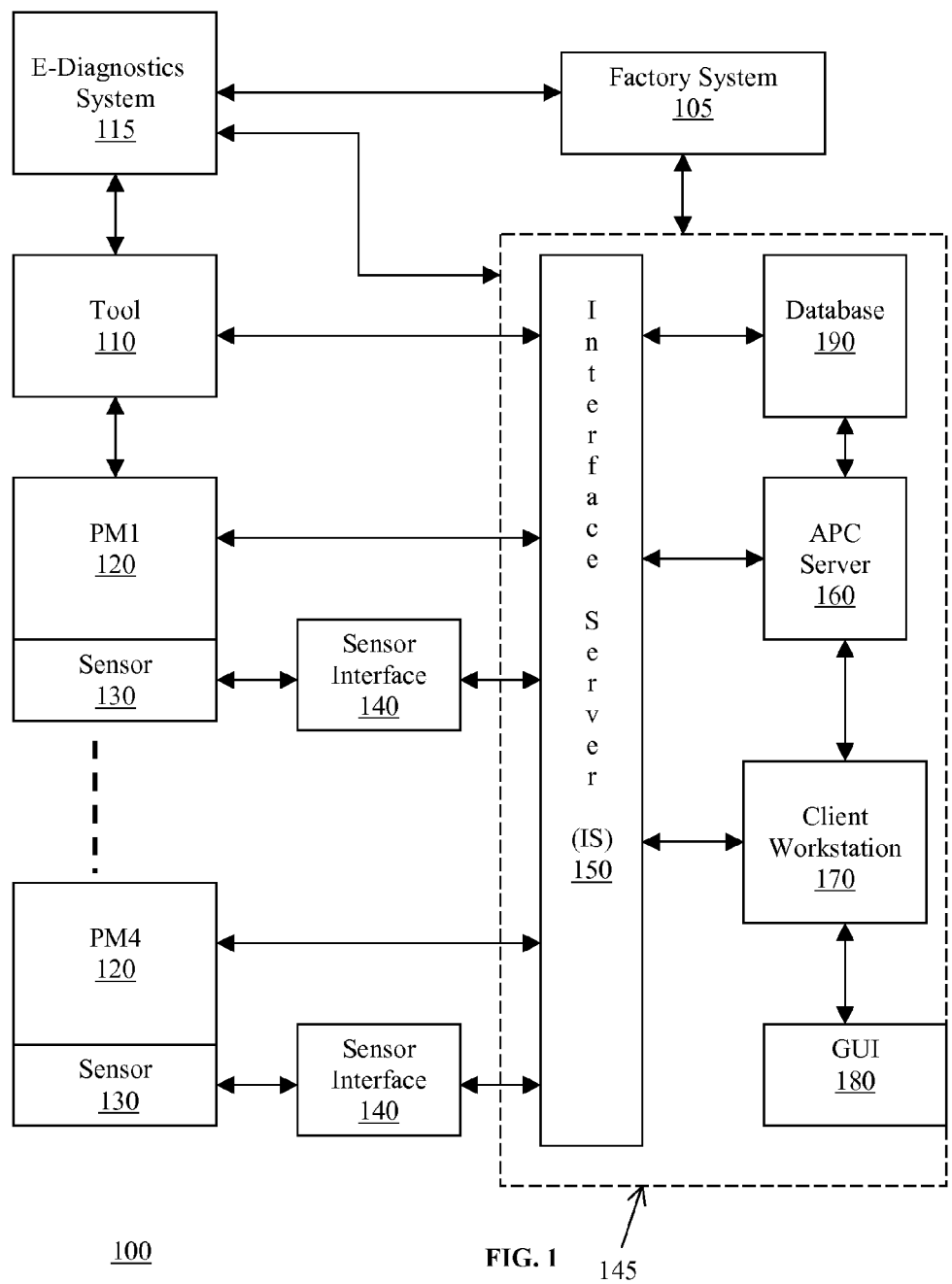
FIG. 1 shows an exemplary block diagram of an advanced process controlled (APC) semiconductor manufacturing system in accordance with one embodiment of the present invention.

FIG. 1 shows an exemplary block diagram of an APC system in a semiconductor manufacturing environment in accordance with one embodiment of the present invention. In the illustrated embodiment, semiconductor manufacturing environment 100 comprises at least one semiconductor processing tool 110, multiple process modules 120, PM1 through PM4, multiple sensors 130 for monitoring the tool, the modules, and processes, sensor interface 140, and APC system 145. APC system 145 can comprise interface server (IS) 150, APC server 160, client workstation 170, GUI component 180, and database 190. In one embodiment, IS 150 can comprise a real-time memory database that can be viewed as a "Hub".

APC system 145 can comprise a tool level (TL) controller (not shown) for controlling at least one of a processing tool, a process module, and a sensor.

In the illustrated embodiment, a single tool 110 is shown along with four process modules 120, but this is not required for the invention. The APC system can interface with a number of processing tools including cluster tools having one or more process modules, and the APC system can be used to configure and monitor a number of processing tools including cluster tools having one or more process modules. For example, the tools and their associated process modules can be used to perform etching, deposition, diffusion, cleaning, measurement, polishing, developing, transfer, storage, loading, unloading, aligning, temperature control, lithography, integrated metrology (IM), optical data profiling (ODP), particle detection, and other semiconductor manufacturing processes.

In one embodiment, processing tool 110 can comprise a tool agent (not shown), which can be a software process that runs on a tool 110 and which can provide event information, context information, and start-stop timing commands used to synchronize data acquisition with the tool process. Also, APC system 145 can comprise an agent client (not shown) that can be a software process that can be used to provide a connection to the tool agent. For example, APC system 145 can be connected to processing tool 110 via an internet or intranet connection.

In one embodiment, IS 150 communicates using sockets. For example, the interface can be implemented using TCP/IP socket communication. Before every communication, a socket is established. Then a message is sent as a string. After the message is sent, the socket is cancelled.

Alternately, an interface can be structured as a TCL process extended with C/C++ code, or a C/C++ process that uses a special class, such as a Distributed Message Hub (DMH) client class. In this case, the logic, which collects the process/tool events through the socket connection can be revised to insert the events and their context data into a table in IS 150.

The tool agent can send messages to provide event and context information to APC system. For example, the tool agent can send lot start/stop messages, batch start/stop messages, wafer start/stop messages, recipe start/stop messages, and/or process start/stop messages. In addition, the tool agent can be used to send and/or receive set point data and to send and/or receive maintenance counter data.

When a processing tool comprises internal sensors, the processing tool can be considered a sensor, and this data can be sent to the APC system. Data files can be used to transfer this data. For example, some processing tools can create trace files that are compressed in the tool when they are created. Compressed and/or uncompressed files can be transferred. When trace files are created in the processing tool, the trace data may or may not include end point detection (EPD) data. The trace data can be updated and transferred after the processing of a wafer is completed. Trace files are be transferred to the proper directory for each process. In one embodiment, tool trace data, maintenance data, and EPD data can be obtained from a processing tool 110.

In FIG. 1, four process modules are shown, but this is not required for the invention. The semiconductor processing system can comprise any number of processing tools having any number of process modules associated with them and independent process modules. The APC system 145 (including one or more TL controllers) can be used to configure, control, and monitor any number of processing tools having any number of process modules associated with them and independent process modules. The APC system can collect, provide, process, store, and display data from processes involving processing tools, process modules, and sensors.

Process modules can be identified using data such as ID, module type, gas parameters, and maintenance counters, and this data can be saved into a database. When a new process module is configured, this type of data can be provided using a module configuration panel/screen in GUI component 180. For example, the APC system can support the following tool types from Tokyo Electron Limited: Unity-related process modules, Trias-related process modules, Telius-related process modules, OES-related modules, and ODP-related modules. Alternately, the APC system can support other tools and their related process modules. For example, APC system 145 can be connected to process modules 120 via an internet or intranet connection.

In the illustrated embodiment, a single sensor 130 is shown along with an associated process module, but this is not required for the invention. Any number of sensors can be coupled to a process module. Sensor 130 can comprise an ODP sensor, an OES sensor, a voltage/current probe (VIP) sensor, an analog sensor, and other types of semiconductor processing sensors including digital probes. The APC data management applications can be used to collect, process, store, display, and output data from a variety of sensors.

In the APC system, sensor data can be provided by both external and internal sources. External sources can be defined using an external data recorder type; a data recorder object can be assigned to each external source; and a state variable representation can be used.

Sensor configuration information combines sensor type and sensor instance parameters. A sensor type is a generic term that corresponds to the function of the sensor. A sensor instance pairs the sensor type to a specific sensor on a specific process module and tool. At least one sensor instance is configured for each physical sensor that is attached to a tool.

For example, an OES sensor can be one type of sensor; a voltage/current (VI) probe can be another type of sensor, and an analog sensor can be a different type of sensor. In addition, there can be additional generic types of sensors and additional specific types of sensors. A sensor type includes all of the variables that are needed to set up a particular kind of sensor at run time. These variables can be static (all sensors of this type have the same value), configurable by instance (each instance of the sensor type can have a unique value), or dynamically configurable by a data collection plan (each time the sensor is activated at run time, it can be given a different value).

A "configurable by instance" variable can be the sensor/probe IP address. This address varies by instance (for each process chamber) but does not vary from run to run. A "configurable by data collection plan" variable can be a list of harmonic frequencies. These can be configured differently for each wafer based on the context information. For example, wafer context information can include tool ID, module ID, slot ID, recipe ID, cassette ID, start time and end time. There can be many instances of the same sensor type. A sensor instance corresponds to a specific piece of hardware and connects a sensor type to the tool and/or process module (chamber). In other words, a sensor type is generic and a sensor instance is specific.

As shown is FIG. 1, sensor interface 140 can be used to provide an interface between sensor 130 and the APC system 145. For example, APC system 145 can be connected to sensor interface 140 via an internet or intranet connection, and sensor interface 140 can be connected to sensor 130 via an internet or intranet connection. Also, sensor interface 140 can act as a protocol converter, media converter, and data buffer. In addition, sensor interface 140 can provide real-time functions, such as data acquisition, peer-to-peer communications, and I/O scanning. Alternately, sensor interface 140 can be eliminated, and the sensor 130 can be directly coupled to APC system 145.

Sensor 130 can be a static or dynamic sensor. For example, a dynamic VI sensor can have its frequency range, sampling period, scaling, triggering, and offset information established at run-time using parameters provided by a data collection plan. Sensor 130 can be an analog sensor that can be static and/or dynamic. For example, analog sensors can be used to provide data for ESC voltage, matcher parameters, gas parameters, flow rates, pressures, temperatures, RF parameters, and other process related data. Sensor 130 can comprise at least one of a: VIP probe, OES sensor, analog sensor, digital sensor, ODP sensor, and other semiconductor processing sensors.

In one embodiment, a sensor interface can write the data points to a raw data file. For example, IS 150 can send a start command to the sensor interface to initiate data acquisition and can send a stop command to cause the file to be closed. IS 150 can then read and parse the sensor data file, process the data and post the data values into the in-memory data tables.

Alternately, the sensor interface could stream the data in real time to the IS 150. A switch could be provided to allow the sensor interface to write the file to disk. The sensor interface can also provide a method to read the file and stream the data points to the IS 150 for off-line processing and analysis.

As shown in FIG. 1, APC system 145 can comprise a database 190. Tool maintenance data can be stored in database 190. In addition, raw data and trace data from the tool can be stored as files in the database 190. The amount of data depends on the data collection plans configured by the user, as well as the frequency with which processes are performed and processing tools are run. For example, data collection plans can be established for determining how and when to collect tool status and process-related data. The data obtained from the processing tools, the processing chambers, the sensors, and the APC system is stored in tables.

In one embodiment, the tables can be implemented in the IS 150 as in-memory tables and in database 190 as persistent storage. The IS 150 can use Structured Query Language (SQL) for column and row creation as well as posting data to the tables. The tables can be duplicated in the persistent tables in database 190 (i.e., DB2 can be used) and can be populated using the same SQL statements.

In the illustrated embodiment, IS 150 can be both an in-memory real-time database and a subscription server. For example, client processes are able to perform database functions using SQL with the familiar programming model of relational data tables. In addition, the IS 150 can provide a data subscription service where the client software receives asynchronous notification whenever data that meets their selection criteria is inserted, updated, or deleted. A subscription uses the full power of an SQL select statement to specify which table columns are of interest and what row selection criteria is used to filter future data change notifications.

Because the IS 150 is both a database and a subscription server, clients can open "synchronized" subscriptions to existing table data when they are initialized. The IS 150 provides data synchronization through a publish/subscribe mechanism, in-memory data tables, and supervisory logic for marshalling events and alarms through the system. The IS 150 provides several messaging TCP/IP based technologies including sockets, UDP, and publish/subscribe.

For example, the IS 150 architecture can use multiple data hubs (i.e., SQL databases) that can provide real-time data management and subscription functions. Application modules and user interfaces use SQL messages to access and update information in the data hub(s). Due to performance limitations associated with posting run time data to the relational database, run time data is posted to in-memory data tables managed by the IS 150. The contents of these tables can be posted to the relational database at the end of wafer processing.

In the illustrated embodiment shown in FIG. 1, a single client workstation 170 is shown but this is not required for the invention. The APC system 145 can support a plurality of client workstations 170. In one embodiment, the client workstation 170 allows a user to configure sensors; to view status including tool, chamber, and sensor status; to view process status; to view historical data; to view fault data, and to perform modeling and charting functions.

In the illustrated embodiment shown in FIG. 1, APC system 145 can comprise an APC server 160 that can coupled to IS 150, client workstation 170, GUI component 180, and database 190, but this is not required for the invention. The APC server 160 can comprise a number of applications including at least one tool-related application, at least one module-related application, at least one sensor-related application, at least one IS-related application, at least one database-related application, and at least one GUI-related application. In addition, APC server can comprise a number of process-related applications.

The APC server 160 comprises at least one computer and software that supports multiple process tools; collects and synchronizes data from tools, process modules, sensors, and probes; stores data in a database, enables the user to view existing charts; and provides fault detection. For example, APC server 160 can comprise operational software, such as the Ingenio software, from Tokyo Electron. The APC server allows online system configuration, online lot-to-lot fault detection, online wafer-to-wafer fault detection, online database management, and performs multivariate analysis of summary data using models based upon historical data. In addition, the APC allows real-time monitoring of processes and processing tools.

For example, APC server 160 can comprise a minimum of 3 GB available disk space; at least 600 MHz CPU (Dual processors); a minimum 512 Mb RAM (physical memory); a 9 GB SCSI hard drives in a RAID 5 configuration; a minimum disk cache that is twice the RAM size; Windows 2000 server software installed; Microsoft Internet Explorer; TCP/IP Network protocol; and at least two network cards.

APC system 145 can comprise at least one storage device that stores files containing raw data from sensors and files containing trace data from the tool. If these files are not managed properly (i.e., deleted regularly), the storage device can run out of disk space, and can stop collecting new data. The APC system 145 can comprise a data management application that allow the user to delete older files, thereby freeing disk space so that data collection can continue without interruption. The APC system 145 can comprise a plurality of tables that are used to operate the system, and these tables can be stored in database 190. In addition, other computers (not shown), such as on-site or off-site computers/workstations and/or hosts, can be networked to provide functions such as data/chart viewing, statistical process control (SPC) charting, EPD analysis, file access, for one or many tools.

As shown in FIG. 1, the APC system 145 can comprise a GUI component 180. For example, a GUI component can run as an application on the APC server 160, client workstation 170, and tool 110.

GUI component 180 enables an APC system user to perform the desired configuration, data collection, monitoring, modeling, and troubleshooting tasks with as little input as possible. The GUI design complies with the SEMI Human Interface Standard for Semiconductor Manufacturing Equipment (SEMI Draft Doc. #2783B) and with the SEMATECH Strategic Cell Controller (SCC) User-Interface Style Guide 1.0 (Technology Transfer 92061179A-ENG). Those skilled in the art will recognize that GUI panels/screens can comprise a left-to-right selection tab structure and/or a right-to-left structure, a bottom-to-top structure, a top-to-bottom structure, a combination structure or any other structure.

In addition, although the screens shown for illustration were English language versions this is not required for the invention and different languages can be used.

Also, GUI component 180 provides a means of interaction between the APC system and the user. When the GUI begins, a logon screen that validates the user identification and password can be displayed and that provides a first level of security. Desirably, users can be registered using a security application before logging on. A database check of user identification indicates an authorization level, which will streamline the GUI functions available. Selection items for which the user is not authorized can be differently and unavailable. The security system also allows a user to change an existing password. For example, the logon panel/screen can be opened from a browser tool such as Netscape or Internet Explorer. A user can enter a user ID and password in the logon fields.

Authorized users and administrators can use GUI panels/screens to modify system configuration and sensor setup parameters. The GUI component 180 can comprise a configuration component for allowing a user to configure processing tools, processing modules, sensors, and the APC system. For example, GUI configuration panels/screens can be provided for at least one of a processing tool, a processing module, a sensor, a sensor instance, a module pause, and an alarm. Configuration data can be stored in an attribute database table and can be setup with the defaults at the installation.

The GUI component 180 can comprise a status component for displaying the current status for processing tools, processing modules, sensors, and the APC system. In addition, the status component can comprise a charting component for presenting system-related and process-related data to a user using one or more different types of charts.

Also, GUI component 180 can comprise a real-time operational component. For example, a GUI component can be coupled to a background task, and shared system logic can provide the common functionality used both by the background task and by the GUI component. Shared logic can be used to guarantee that the returned values to the GUI component are the same as the ones returned to the background task. Furthermore, the GUI component 180 can comprise an APC file management GUI component and a security component. Help panels/screens are also available. For example, help files are provided in PDF (Portable Document Format) and/or HTML format.

As shown in FIG. 1, an APC system 145 can be coupled to a factory system 105 and/or an E-Diagnostics system 115. Factory system 105 and/or E-Diagnostics system 115 can provide means for externally monitoring and for externally controlling the tools, modules, sensors, and processes in a semiconductor processing system. Alternately, the factory system 105 and/or an E-Diagnostics system 115 can perform tool status monitoring. For example, a user can access the tool status monitoring system using a web based terminal that is coupled to the semiconductor processing system via factory system 105 and/or an E-Diagnostics system 115.

In addition, the APC system and the E-Diagnostic system can work together to solve problems in real time. For example, when the APC system 145 detects a fault, the information needed to diagnose the problem can be bundled by the APC server and transmitted to the E-Diagnostic system or stored for access by the E-Diagnostic system at a later time. The operating method can be determined using security constrains and/or customer business rules.

Also, the APC comprises means for adding sensors, editing data collection plans that are context and/or event driven. For example, this can allow E-Diagnostics "probes" and/or software components to be downloaded for the E-Diagnostic system to trouble shoot the system. The APC system can comprise a portable set of diagnostic tools that can provide additional data, which can be used to diagnose, detect, and/or predict a problem. For example, the APC system can use these diagnostic tools as additional sensors. With a general sensor interface that support multiple protocols, including analog input as the lowest level, a local portable diagnostic unit can be coupled to the factory system and then used remotely by the APC system, the E-Diagnostic system and/or the factory system.

The APC system can be provided with a new application that was remotely developed at the factory and downloaded from the factory or the E-Diagnostic system. For example, the new application can reside locally in the APC server. The APC system has the ability to learn new procedures and dynamically add sensors, add applications, and even add GUI screens for a custom sensor. Furthermore, the APC system can perform very specific procedures such as a timing analysis allocation to figure out when a tool and/or module malfunctions (i.e. a wafer handling system problem with a motor or actuator arm position).

In addition, the APC system can change the sampling rate based on the tool performance. For example, the data collection sampling rates and amount of analysis can be changed based on tool health. The APC system can also predict a problem or detect that a tool and/or module is running near a limit condition.

In addition, advanced users and administrators can use GUI screens to modify system configuration and sensor setup parameters; create and edit tool-related strategies and plans; and/or modify the number tools and modules.

The APC system is implemented using a configurable system that enables customers (end users) to add processing tools, process modules, and/or sensors. The APC system provides a development environment and methodology that enables customers to customize the monitoring software, to add analysis applications, and/or to install and monitor new tools, modules, and sensors in the environment.

The APC system improves the Overall Equipment Effectiveness (OEE) and Cost Of Ownership (COO) of the processing tools by providing the customer with a monitoring system that extends the tool's consumable life and provides detection of potential failure signatures.

The APC system software architecture includes four functional components: a data acquisition component, a messaging system component, a relational database component, and a post-processing component. The architecture also includes in-memory data tables used for storing run-time data acquisition parameters. External to the APC system is the tool, as well as a tool agent, which provides context information and start-stop timing commands used to synchronize data acquisition with the tool process.

The data acquisition component collects data points, called parameters and writes them to a file. The messaging system uses in-memory data tables for temporary storage of the run-time data received from the data acquisition component. The messaging system is notified of the start and end of the data acquisition period by an agent and/or tool client. At the end of the data acquisition period, the data is posted to the relational database and the in-memory data tables are cleared for the next acquisition period. Post processing of the data supplied by the messaging system is performed at run-time; post processing of the data stored in the relational database is performed off-line.

The goal of the APC system is to use real-time and historical data to improve the semiconductor processing system's performance. To achieve this goal, potential problems can be predicted and corrected before they occur, thus reducing equipment downtime and the number of non-product wafers that are produced. This can be accomplished by collecting data and then feeding that data into a software algorithm that models the behavior of a particular tool, process module, and/or sensor. The APC system outputs process parametric adaptations that are then either fed forward or back to keep the tool performance within the specified limits. This control can be accomplished in different forms at different levels.

The alarm management portion of the APC system can provide fault detection algorithms, fault classification algorithms, and/or fault forecasting algorithms. The APC system can predict when a tool, process module, and/or sensor might malfunction, and can identify possible solutions to correct the malfunction and to reduce the number of non-product wafers that are produced during maintenance and processing functions.

Fault forecasting is a combination of fault detection and failure modeling. This method can be used to optimize chamber cleaning and the replacement of consumable parts and it is intended to facilitate "opportunistic scheduling" of preventive maintenance tasks when there is a lull in production. Fault forecasting can be based either on a complex multivariate model or a simple univariate relationship (e.g. APC angle for a wet clean in etch). For example, fault forecasting can be used to predict when a tool, process module, and/or sensor might fail, and when to perform maintenance on a tool, process module, and/or sensor.

The GUI applications give the user the ability to determine if a sensor is collecting data. When a data collection plan does not require data from a sensor, the sensor status state provides the user an indication that this sensor is not expected to be on. For example, when a data collection plan does not require data from a sensor the sensor status should be "on-line off", and when the user has disabled a sensor at the system level the state should be "off-line off".

The interface to a tool, module, and/or sensor is tolerant to failures and service related disruptions. Additionally the interface provides setup and trouble shooting capability. For example, when a disruption occurs, the tool, module, and/or sensor and/or APC system can detect the disruption and initiate logging, alarms and automatic recovery/analysis to determine the correct behavior and to minimize the loss of functionality. In this way, the risk to the customer of producing product while a tool, module, sensor, and/or APC system is operating at a decreased functionality can be reduced.

In addition, the trouble-shooting and/or maintenance applications can operate during the service/maintenance mode. For the purpose of trouble shooting sensor communications, a sensor can be tested without running wafers. For example, a sensor can be set up, started and stopped from a WEB based GUI. This feature can be commonly used at sensor setup and routine sensor maintenance.

Figure 2:
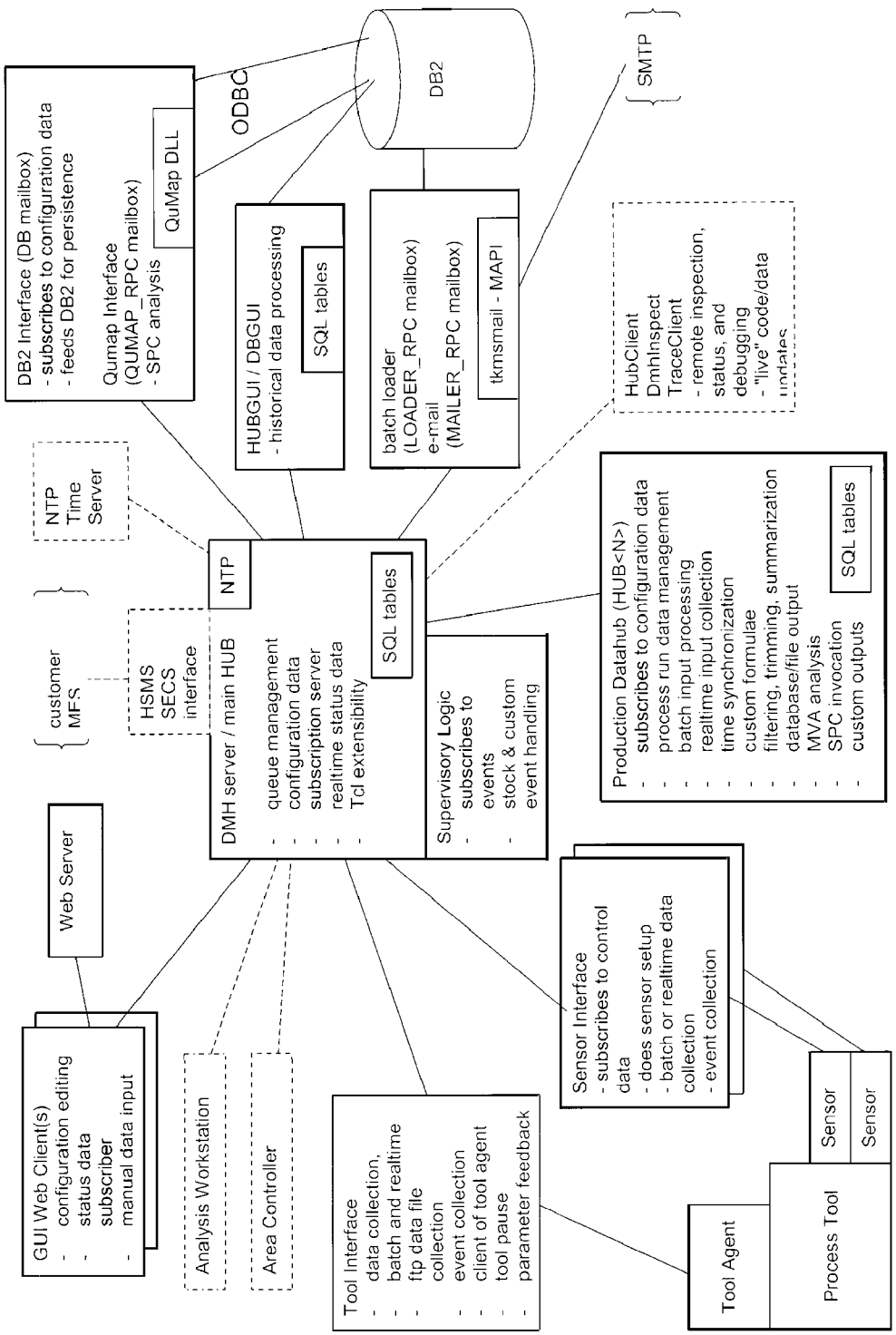
FIG. 2 shows an exemplary interconnect diagram for a data hub in accordance with one embodiment of the present invention.

FIG. 2 shows an exemplary interconnect diagram for a data hub in accordance with one embodiment of the present invention. As shown in illustrated embodiment, a plurality of data hubs can be used to integrate Tcl with real-time data management and subscription functions. For example, application modules and user interfaces can use SQL messages for accessing and updating information in the data hub(s), and through real-time subscriptions stay synchronized with information contained in the data hubs. Message communication can use a simple mailbox model, and Tcl application processes. Robust, high-performance inter-process communication is made possible using a distributed message hub (DMH) message system.

The DMH system can support the exchange of international character data. The DMH system can feature interprocess communication on a single workstation, or across workstations, or spanning a variety of runtime environments. This makes it feasible to deploy a DMH client connection on a sensor vendor's system, or running native on the process tool.

One issue in distributed systems is providing a consistent view of shared data throughout the application and doing it in an efficient manner. A subscription concept can be employed. In this scheme, the user of a data item initiates a subscription to the data item with a subscription server. When the data item is updated, the user process receives an asynchronous notification from the subscription server. Now there is no polling—the user process accurately tracks the item of interest.

The combination of DMH and data hub functionality enables complex tasks like time synchronizing run data—when the data is inserted into a table and indexed by runtime, it is time synchronized. The high-level, data-rich application environment gives the user the tools needed to process and prepare summary data as dictated by a data configuration, and not as dictated by inflexible lines of code. The availability of the Tcl interpreter, and an SQL interpreter provide the mechanisms for custom parameter data formulas, and for the dynamic matching of context criteria. Also, the interpreter provides the capability to expose custom scripting to the end-user customer.

For example, the DMH message system server can serve as the home for configuration data such as strategies, output plans, and device setup information. At startup, the configuration data is read from DB2. While the system runs, GUI clients and Sensor Interface clients can query or subscribe to configuration and setup data managed in this process. Changes to the configuration are made in this process and fed by subscription to the rest of the system. Changes to the configuration data is also fed by subscription to the DB2 database by way of the DB2 Interface process. The status data is maintained in a data hub table, one data item per row. The GUI clients open a subscription when the status screens are viewed so that the status view is automatically refreshed. There is a table to represent process tool and system events with their associated context data. This table permits the coding of the tool interface to be deployed and tested independent of the processing of the tool events.

"Supervisory Logic" can be distributed through the system. Some of the event handling will be deployed in the main HUB. For example, subscription logic can react when a process run is starting, match the prerun device setup strategy, and update another table to indicate the desired current configuration of sensor devices. At least some of the event management can be structured in terms of asynchronous interactions, executed in the main hub.

In one embodiment, a database server (data hub) can be configured to run as a Windows NT service. For example, this allows the application to start with the system boot, without a user logon; this allows the application to stay running while users logon and logout; this allows the application to be configured to not interact with the user's display; and this allows the application to use a different logon account with security credentials that differ from those of the logged-in user.

A data hub can provide an in-memory real-time database and a subscription server. The data hub can provide an in-memory SQL database for high-performance real-time data collection, data time synchronization, and the processing of raw data streams into SQL tables and files for input into analysis and monitoring applications. The data hub can also be a server for the DMH. The DMH can provide inter-process communication with a simplified, high-level programming interface. For example, the data hub can provide a data subscription service where client-software receives asynchronous notification whenever data that meets their selection criteria is inserted, updated, or deleted. A subscription can use the full power of an SQL "select" statement to specify which table columns are of interest and what row selection criteria is used to filter future data change notifications. The data hub can also provide queue management, which makes it easy to support clients, such as web applications, that come and go dynamically. The data hub can also enable coupling high-speed processes, such as data acquisition, as well as low-speed processes, such as input, into a persistent database. The data hub can be an application logic server that combines the performance of a compiled language environment with the flexibility of an interpreted environment. Custom logic can be deployed using Tool Command Language (TCL) code. When first executed, TCL code can be transparently compiled into an internal byte code representation for higher performance. For example, TCL code for receiving and executing TCP/IP messages requires less than a dozen programming statements. The data hub is also extensible using dynamically loaded C/C++ code.

User developed procedures can be written in the Tcl programming language, or coded in C/C++ and dynamically loaded as DLLs. During runtime, procedures can be revised, removed, or added. For best performance, the interpreter compiles the Tcl code during its first execution. User written procedures execute when they are called by subscription notification, or when they are invoked by messages sent from external client processes. The Tcl procedures have complete access to the application database tables without the overhead of inter-process communication. Further, user written Tcl procedures have access to the rich set of Tcl commands including file system and socket 10, calendar and time functions, ODBC database access, DMH message functions, and of course, other application procedures.

Because the data hub can be both a database and a subscription server, clients can open "synchronized" subscriptions to existing table data when they are initialized. For example, with the APC system, a new user interface session can read the system status data items, and open a subscription to futures changes by sending a single command to the main data hub.

The data hub can work with two additional processes that can be started at system boot. First, there can be an SQL process whose role can be to provide connectivity to the TELAPC persistent database on behalf of DMH message system clients. The second process can be a batch loader process whose role can be to manage and process files of SQL statements containing the data of process runs. Both of these processes can be programmed to shut down if the DMH connection to the data hub is lost.

The data hub can provide web clients access to model configurations and historical data. The Model Data Configuration application uses a set of Java classes that enable DMH message system communication. Logic exists to ensure that the configuration existing in the real-time data hub tables can be maintained in synchronization with configuration data in the persistent database.

For example, the APC server can automatically create a single large ZIP file containing a database table extract for all lots for one calendar day. In this way, the file can be automatically created—no user intervention is necessary; the import can be very fast (approx. 3 minutes per day of data); the file can be a complete mirror of server raw data and summaries; the Tool name can be preserved—useful for multiple APC servers; and each day has one ZIP file.

Figure 3:
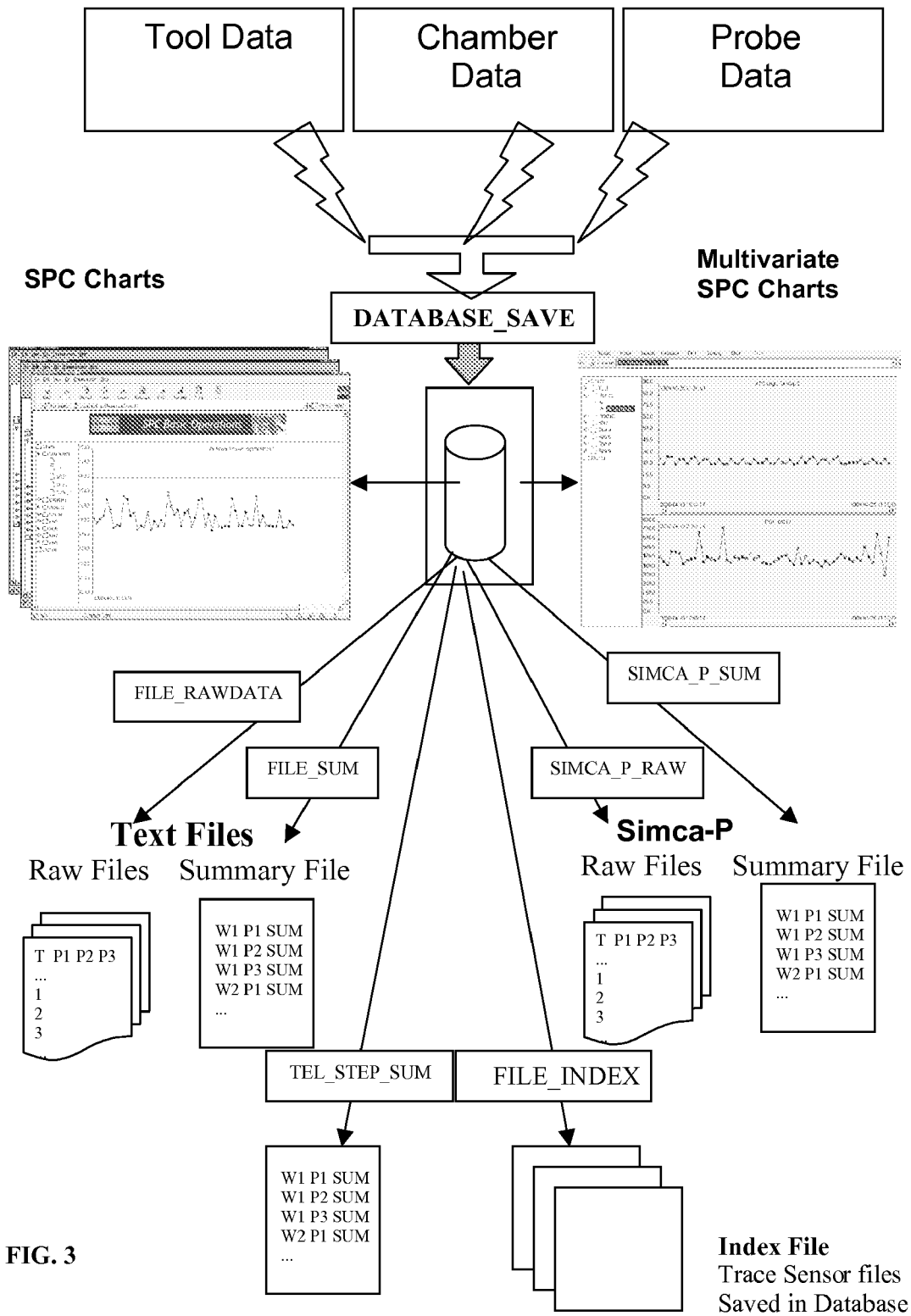
FIG. 3 shows an exemplary data flow diagram for a database in accordance with one embodiment of the present invention.

For database maintenance, daily backups, archives, and deletes can be performed for the databases. For example, backups and archives can be compressed and zipped. This backup method may require tapes installed internally to the system, and human interaction may be required for mounting and formatting the external media and storing the zipped files. An exemplary data flow diagram for a database is shown in FIG. 3.

The APC System's BADDR application can automatically archive the data stored in the database and store the resulting files on the server's hard drive. These files can be deleted based on the settings established using a file system maintenance GUI. It can be the responsibility of the on-site user and/or administrator to copy these archived files to external media before they can be automatically deleted.

The file system maintenance component can comprise a file maintenance screen for saving and changing file entries. For example, a file maintenance system can comprise five types of files that can be stored by the APC Controller. A default deletion period for each file type can be set when the APC Controller is installed.

The file types are:

Alert—These logs contain information such as system error messages and event timestamps, and they can be used for troubleshooting;

DbArchive—These files can be created by the BADRR application. They can be zipped files containing the data that has been saved in the database based on the Data Collection Plans configured by the user;

Event—These logs can be generated based on event information passed from a Tool Agent;

Raw—Raw files include trace and process files transferred from the tool, as well as files containing OES and VIP sensor data;

RawIndex—These files contain information about Apc-data raw.

Figure 4A:
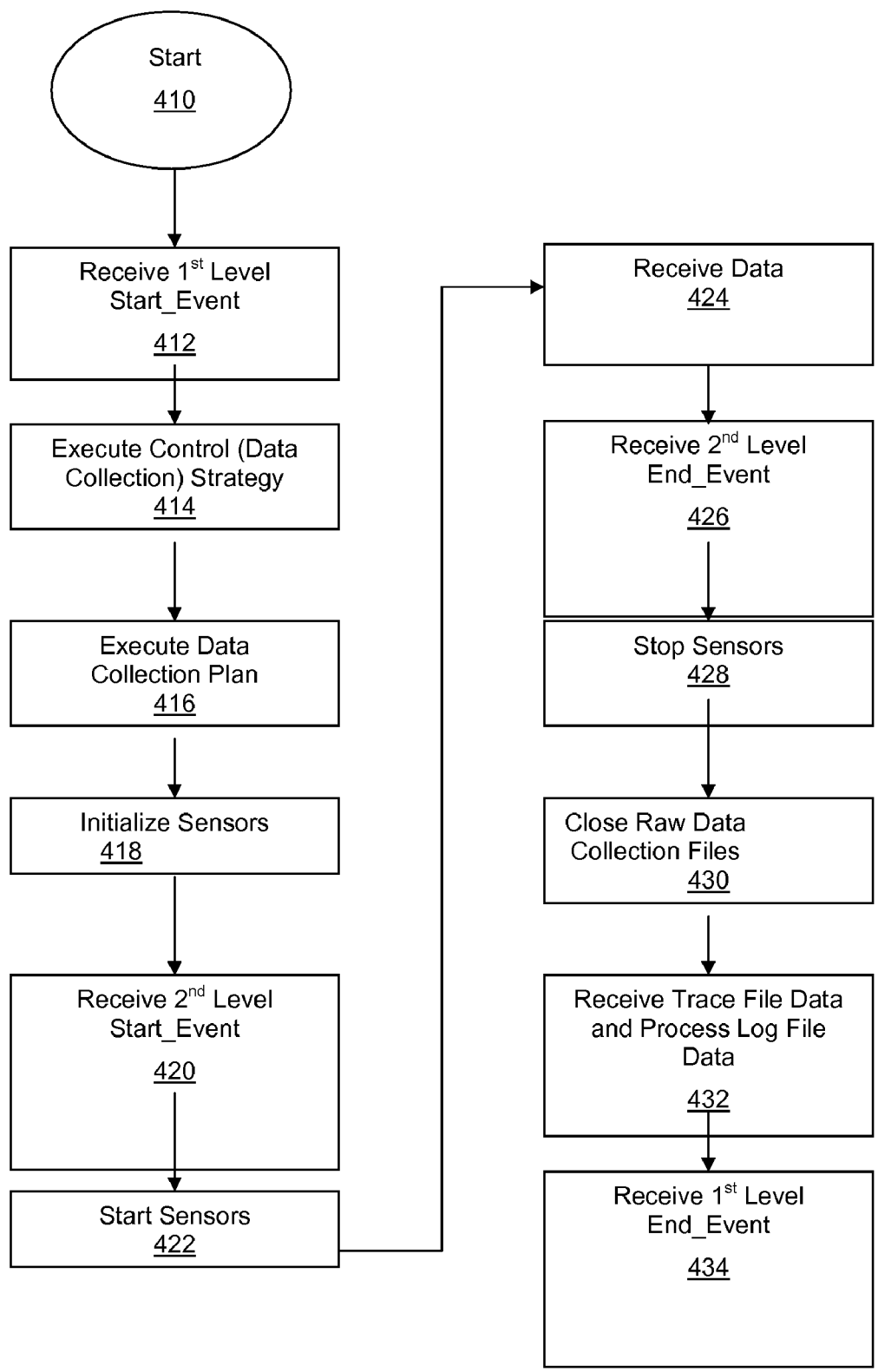
FIGS. 4A and 4B show a simplified view of a flow diagram for managing data in a semiconductor processing system in accordance with one embodiment of the present invention.
Figure 4B:
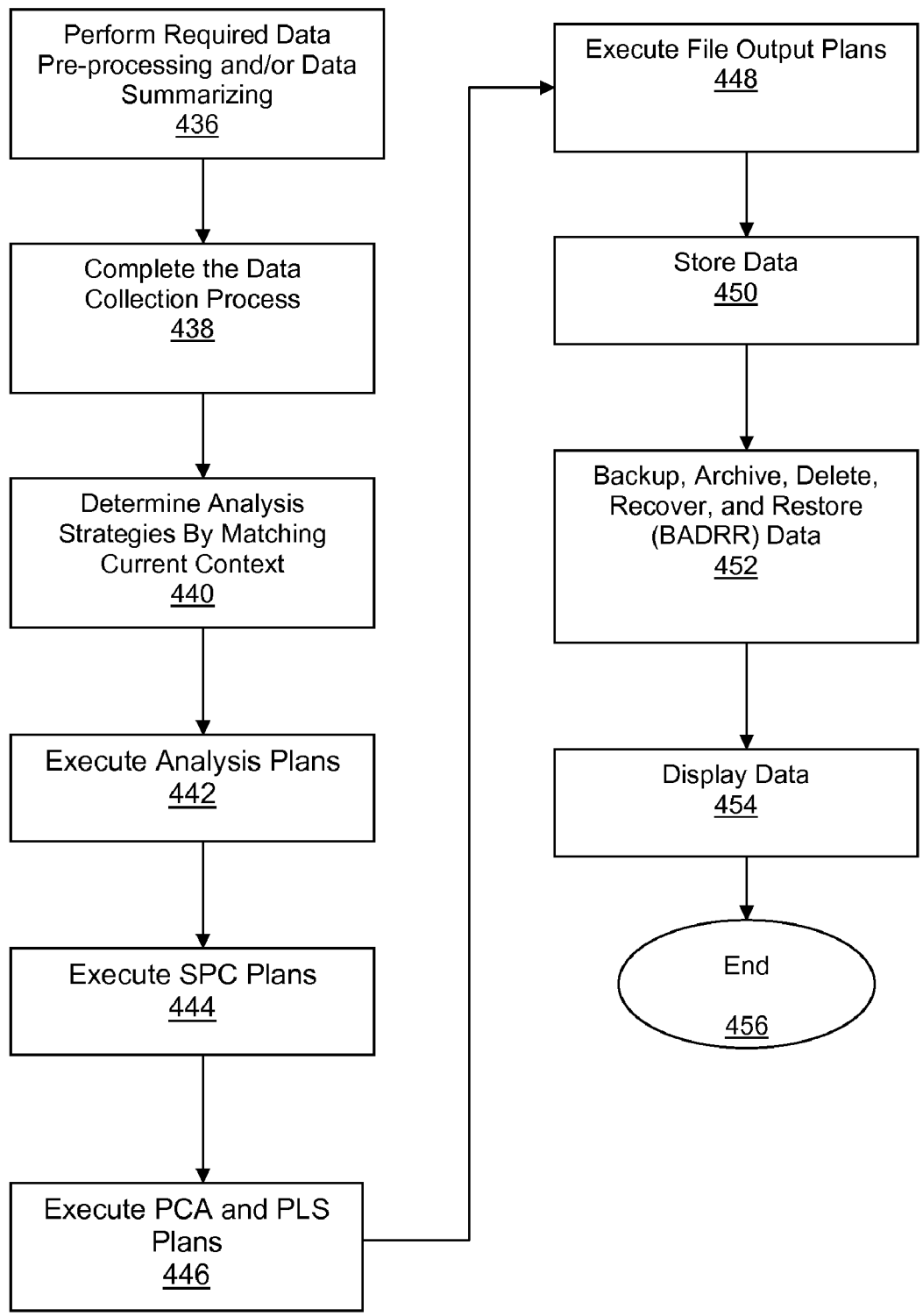

FIGS. 4A and 4B show an exemplary view of a flow diagram for managing data in a semiconductor processing system in accordance with one embodiment of the present invention. The software and associated GUI screens provides a procedure for managing data from one or more processing tools in a system. Procedure 400 can be performed for each processing tool in the semiconductor processing system. Alternately, procedure 400 can be performed for a group of processing tools in the semiconductor processing system.

Procedure 400 starts in 410. Before a process can begin, a processing tool, processing chamber, and a plurality of sensors can be configured. A process can contain several different levels of start points and end points. A process can define a set of steps for a wafer, a lot, a batch, a tool, a chamber, or a combination of tool activities.

In 412, a first level Start_Event can be received. For example, a processing tool controller can send a first level Start_Event to the APC system. Alternately, another computer can send the first level Start_Event.

A Start_Event can be a point in time when a process or recipe step starts and can be context-based. For example, Wafer_In, Recipe_Start, Process_Start, Step_Start, Module_Start, and Tool_Start can be Start_Events. Also, a first level Start_Event can occur when a wafer enters a processing chamber. Alternately, a Start_Event can occur when a wafer enters a transfer chamber or when a wafer enters a processing system.

In 414, a control strategy can be executed. A control strategy can be determined based on a process context. Control strategies define what happens during a set of sequences on a processing tool. Strategies can define set of sequences for a single wafer, a single tool, a single lot, or a combination of tool activities. A Control strategy can include a combination of processing activities, configuration/setup activities, measurement activities, pre-conditioning activities, pre-measurement activities, and post-measurement activities. Each part (group of activities) in a strategy is called a plan. Context can be defined by a combination of the context elements. For example, context can be an array of the context elements in a pre-determined order, or context may be a set of name-value pairs in a dictionary form.

Figure 5:
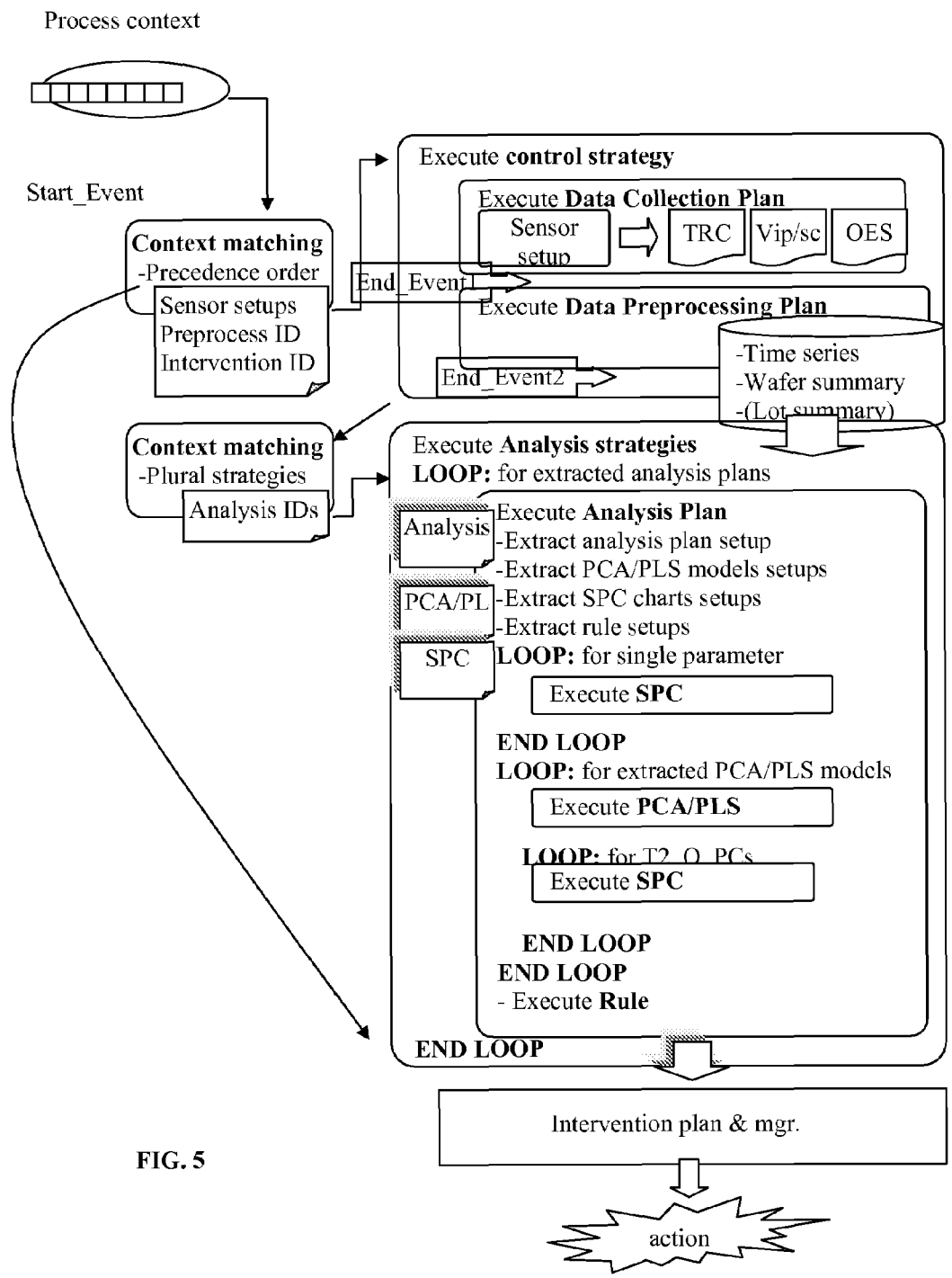
FIG. 5 shows an exemplary flow diagram for strategies and plans in accordance with one embodiment of the present invention.

A control strategy "controls" how the data can be managed. A control strategy can contain at least one data collection (DC) Plan, and a DC plan can be used to determine which data is collected, how the data is filtered, and how the data is stored. An exemplary flow diagram for strategies and plans is shown in FIG. 5.

Context information can be used to associate a given operation with another operation. In particular, the context information associates a process step or recipe with one or more strategies and/or plans. The context determines which strategy and/or plan can be executed for a particular process recipe.

During runtime, a Start_Event causes the APC system to look up the current context data, determine which strategies match the context, determine which plans to run, and invoke their corresponding scripts. A control strategy record can contain context-matching information such as wafer-run, tool, chamber, recipe, slot, etc. For example, the APC System can compare the runtime information and try to match it against a database of strategies—each control strategy containing at least some of the following context information: Tool id, Lot id, Chamber id, Cassette id, Slot id, Wafer id, Recipe id, Start time, End time, Step number, State, Maintenance counter value, Product id and material id. The process context can be dependent upon the process being performed and the tool being monitored. For example, if a recipe contains a context term "Dryclean", then control strategies associated with the "Dryclean" context term can be executed when process tool runs processes with any recipe that contains the context term (element) "Dryclean".

In a context matching process, search order can be important. For example, the search can be executed by using the precedence order in GUI table. The search can be implemented using SQL statements. Once a strategy is identified, data collection plan including a sensor plan, data preprocessing plan and judgment plan can be automatically determined. The data collection plan ID, data preprocessing plan ID, and judgment plan ID can be sent to "execute control strategy" modules. If a matching strategy does not exist when the compare process context function is performed, then the software displays an error message in the fault field in tool status screen and popup windows.

There can be multiple control strategies that match a run context, but only one control strategy can be executed at a particular time for a particular processing tool. The user determines the order of the strategies within a specific context by moving the strategies up or down on the list. When the time comes for the strategy to be selected, the software starts at the top of the list and goes down the list until it finds the first strategy that matches the requirements determined by the context.

Referring back to FIG. 4A, the data collection (DC) Plan can be executed in 416. A data collection plan can be a reusable entity configured by the user to collect, filter, and store the desired data. Each control strategy has an associated data collection plan that includes a data storage component that describes, among other things, how the data should be stored, and how observation parameters should be formatted for storage. The data management component of the APC system is flexible and allows processing tools to collect data. For example, a processing tool can collect data during a wafer run and store the data in a trace file. After each wafer is processed on the tool, the trace file can be copied from the processing tool to the data management component of the APC system, where the software parses the file and posts the data to the in-memory data tables. The in-memory data can then be sent to the post-processing component and finally posted to the relational database.

Figure 6:
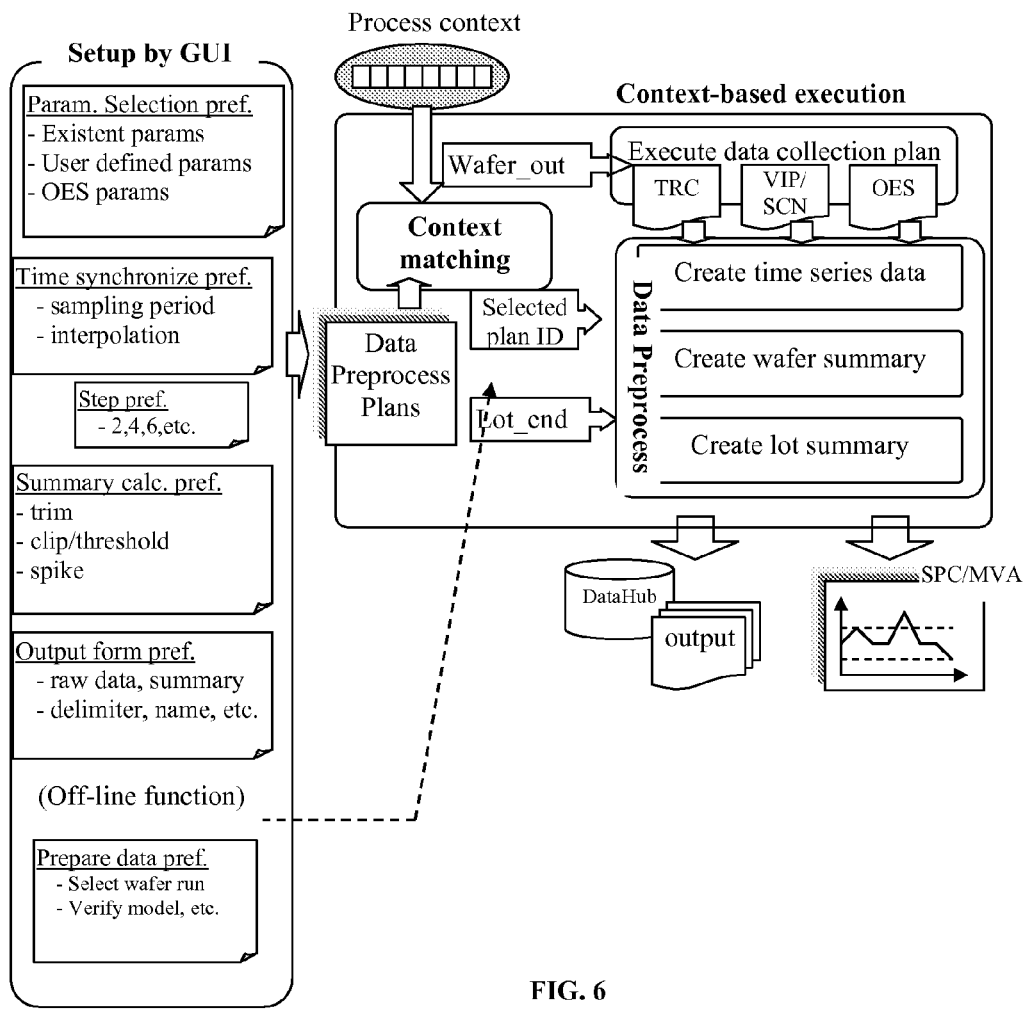
FIG. 6 shows an exemplary flow diagram for a data preprocessing process in accordance with one embodiment of the present invention.

In addition, a DC Plan can comprise a data pre-processing plan. A data pre-processing plan describes how the expected observation parameters are to be processed with respect to data timing and filtering (i.e., spike counting, step trimming, high clip and low clip limits). The data pre-processing plan can also include parameter select definition, time synchronize definition, step definition, summary calc. (trim, clip/threshold, spike) definition, and output definition. The parameter selection in the data pre-processing plan can be sensor specific. The APC system can provide trace parameter lists for each sensor and the default parameter list for it can be dependent upon the tool selected. An exemplary flow diagram for a data pre-processing procedure is shown in FIG. 6.

Also, a DC Plan can comprise a sensor setup plan. A sensor setup plan describes how to configure one or more sensors on one or more separate modules. The plan also includes the selection of the data parameters that should be collected by the associated sensors, and which of the data parameters are to be saved. A sensor can be a device, instrument, chamber type, or other entity that either collects observation data or requires software setup interaction, or can be handled by the system software as if it is a sensor. For example, a processing module (i.e., etch chamber) can be treated as a sensor in data collection plans. Several instances of the same sensor type can be installed on a tool at the same time. The user can select the specific sensor or sensors to use for each data collection plan.

Referring back to FIG. 4A, the sensors can be initialized in 418. For example, a global state variable can be used to keep track of the current state of the data recorder associated with each sensor. Data recorder objects and state variables can be used by the software to keep track of the sensors. The sensor states can be Idle, Ready, and Recording. The Idle state can occur at power up. This can be an initial state. The Idle state can also be the state after recording has stopped. The Ready state can be entered when the sensor has been setup, and it is ready to start recording. The Recording state occurs when the sensor is sent a "start" command and the sensor begins recording data. The sensor remains in the Recording state until the "stop" command is sent.

In 420, a second level Start_Event can be received. For example, a processing tool controller can send a second level Start_Event. Alternately, another computer can send the second level Start_Event. A second level Start_Event can be a Wafer_Start event or a Process_Start event. A Start event can occur after a wafer enters a processing module (chamber). Alternately, the Start event can occur when a setup routine is completed.

In 422, sensors can be started. For example, a sensor setup Item screen can be used to configure a sensor instance and/or change the parameters associated with a sensor instance. A parameter saving screen shows a list of parameters for a selected sensor instance in a selected data collection plan. A Formula Info screen can provide a user-friendly formula editor for a selected parameter.

Figure 7:
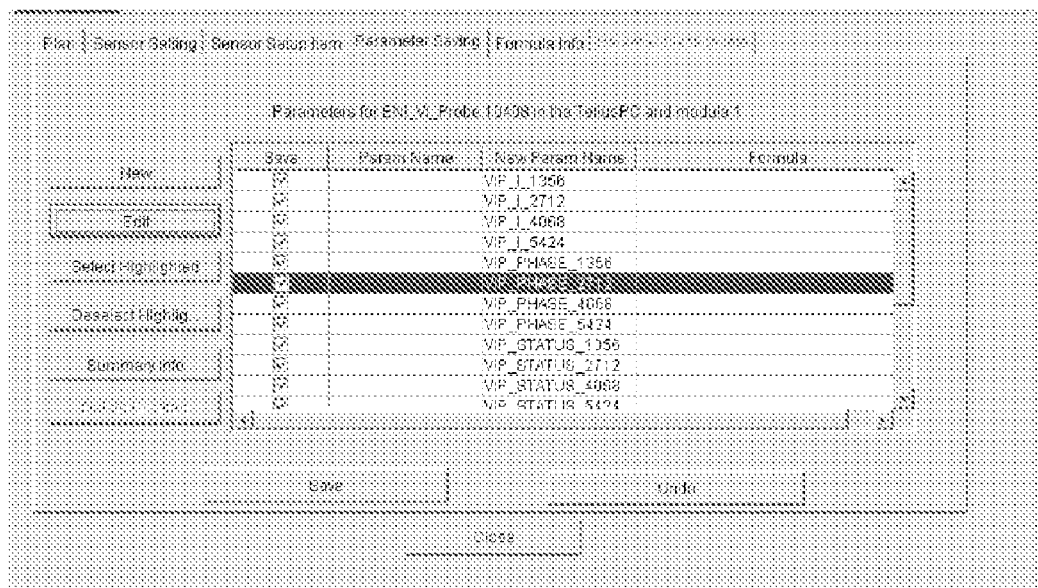
FIG. 7 shows an exemplary view of Parameter Saving screen in accordance with one embodiment of the present invention.

An exemplary view of a Parameter saving screen is shown in FIG. 7. In FIG. 7, an information panel is shown with selection tabs. The selection tabs can be used to select other GUI screens. Alternately, a navigation tree can be used to display and select other GUI screens. The Parameter saving screen shows a list of parameters for a selected sensor Instance in a selected Data Collection Plan. The database save plan can provide a link to each parameter in the parameter saving screen.

Referring back to FIG. 4A, data can be received in 424. Data can be collected by the data management component of the APC system, using one or more sensors, each one using a data recorder. At run-time, this data can be sent to a raw data file similar to a trace file on a tool. At recipe end, the raw data file can be parsed and the data can be sent to the in-memory data tables, contained, and managed by the hub. For timing, each sensor can be wrapped by a C-DLL (sensor interface), which can provide a consistent interface to the APC server, while providing an interface to each sensor that can be sensor type-specific. Connections between sensor interfaces, hub, database, and APC sever are shown in FIG. 1.

Connection to each sensor can be provided by a sensor interface, which can be implemented as a C-DLL. Run-time status, the most recent data from each sensor, can be available in the data management component and provided to a user by a GUI component. The sensor data can be transferred to the hub at run-time for storage in the in-memory data tables. For example, context information and timing for data acquisition and data processing can be provided by a tool agent and sent to an agent client. The agent client sends timing messages to data management component, and data management component sends timing messages onto the hub. The context information can be used for dynamic sensor configuration. At the end of a wafer-processing step, the hub posts the contents of the in-memory data tables to the relational database and clears the tables for the next wafer-processing step.

For example, each time a new recording is started, a record can be written to a device_run table for each device_id. It is possible for a sensor to have more that one device_id. For example, an OES sensor can use four device_ids because of the volume of data generated by an OES sensor. For each sample of a device_id, a row of data can be inserted into a rawdata table.

Figure 8:
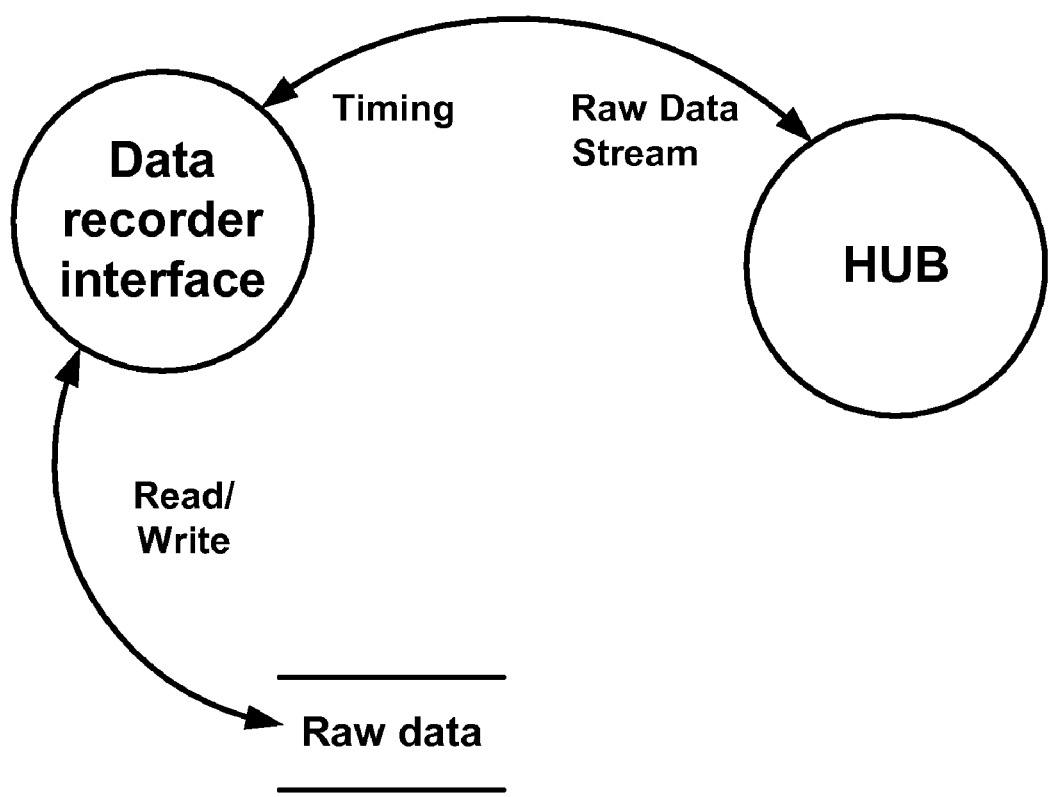
FIG. 8 shows an exemplary implementation of a data recorder interface in accordance with one embodiment of the present invention.

An exemplary implementation of a data recorder interface is shown in FIG. 8. For example, a data recorder interface can stream data in real time to the hub. A switch can be provided to allow the data recorder to write a file to disk. The data recorder can also provide a method to read the file and stream the data point to the hub for off-line processing and analysis.

Alternately, the data recorder interface can write the data points to a raw data file, and the hub can send a start command to the data recorder to initiate data acquisition. A stop command causes the file to be closed. In this case, the hub then reads and parses the data file, processes the data and posts the data values into the in-memory data tables.

In 426, a second level End_event can be received. For example, a processing tool controller can send a second level End_Event. Alternately, another computer can send the second level End_Event. Second level End_Events can be points in time when a process or recipe step stops. Wafer_Out, Recipe_End, Process_End, Step_End, Module_End, and Tool_End can be End_Events. A second level End_Event can be a Wafer_End event, and a Wafer_End event can occur when a wafer exits a processing module (chamber). Alternately, the Wafer_End event can occur when a processing step is completed.

A process recipe can comprise one or more second level Start_events and one or more second level End_events. For example, each process step can comprise a second level Start_event and a second level End_event.

In 428, sensors can be stopped. For example, the state of the recorder can change from Recording to Ready. For the general case, each data recorder can be enabled at the start of a sensor and turned off at the completion of a wafer. In some cases data can be recorded between wafers (environmental data—transfer chamber vacuums, temperatures, humidity, . . . ). In this case, the recorders can have multiple outputs of data associating the data to a wafer at one sample rate and to a machine object at a different sample rate that can be configurable.

In 430, Raw Data Collection Files can be closed. For example, the state of the recorder can change from Ready to Idle.

In 432, Trace File data and Process Log File data can be received from a processing tool. Alternately, Trace File data and/or Process Log File data can be received from another computer.

In 434, a first level End_Event can be received. For example, a processing tool controller can send a first level End_Event. Alternately, another computer can send the first level End_Event. An End_Event can be a point in time when a process or recipe step stops and can be context-based. For example, Wafer_Out, Recipe_Stop, Process_Stop, Step_Stop, Module_Stop, and Tool_Stop can be End_Events. A first level End_Event can occur when a wafer exits a processing chamber (Wafer_Out). Alternately, an End_Event can occur when a wafer exits a transfer chamber or when a wafer exits a processing system.

Wafer data is created by synchronizing the raw data with the trace file and process log file data. The data management component loads the wafer data into the hub. For example, a message can be sent to the hub for each sensor data file with the information needed to call a script that loads the particular sensor data file and key variables to make the wafer run unique in the database. Wafer data can include trace data, process log data, recipe setpoint data, maintenance counter data, and sensor data.

Figure 9:
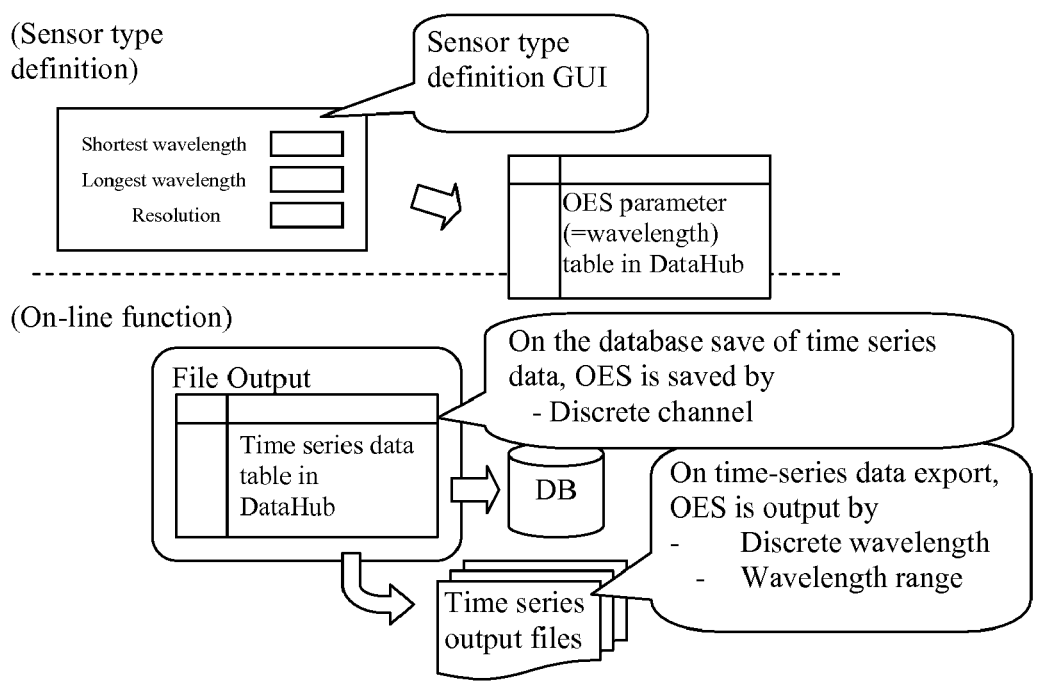
FIG. 9 shows an exemplary flow diagram for an optical emissions spectrometer (OES) sensor in accordance with one embodiment of the present invention.

In 436 (FIG. 4B), data pre-processing and/or data summarization can be performed. For example, the data pre-processing plan can be executed in the data collection hub. Alternately, the APC controller can perform a portion of the data pre-processing plan. Data pre-processing plan can comprise several functions. An exemplary flow diagram for an OES sensor is shown in FIG. 9.

Referring back to FIG. 4B, the setups which are required to execute data preprocess plan can be specified using at least one GUI screen. They can be saved in database as data preprocess plans. When context information comes into APC controller, a "context-based execution" module extracts a proper preprocess plan. Only one preprocess plan can be selected based on the precedence order in the database table. Based on the extracted pre-processing plan, time series data can be created; wafer summary data can be created; and/or lot summary data can be created. When required, custom parameters can be calculated. For example, custom parameters can be created for a Data Collection Plan using a Formula Info screen.

When time series data is created, it can be created from raw data files and stored in the database. Time synchronization can be specified by the data rate. Time synchronization can be used to relate data to recipe steps, and to export data to files.

When wafer summary data is created, it can be created from time series data files and stored in the database. When necessary, data trimming can be performed for parameters associated with a step. When necessary, data clipping can be performed for selected parameters. In addition, spike analysis can be performed for selected parameters as required. Also, statistical values (max, min, ave, 3-sigma) can be calculated. The data can be exported to files, and historical time series data can be loaded from the database.

When lot summary data is created, it can be created from wafer level data files and stored in the database. Data can be chosen using a particular parameter or a step. In addition, statistical values (max, min, ave, 3-sigma) can be calculated. The data can be exported to files, and historical time series data can be loaded from the database. After wafer and lot summary date are calculated, the data can be sent to proper analysis plan (i.e., SPC charts and/or PCA/PLS models).

For example, a "Data Preprocessing" application can receive a Data Preprocessing Plan ID from a "context-based execution" application. The "Data Preprocessing" application can extract the necessary setups before creating time series data. After a wafer_out event, a data collection plan can make trace, VIP/SCN, and OES files ready to process. Then, the "Data Preprocessing" application can start to create time series data in the data hub. As an off-line function, the "Data Preprocessing" application can create a time series data file in accordance with user preferences like tab delimited, comma delimited.

Figure 10:
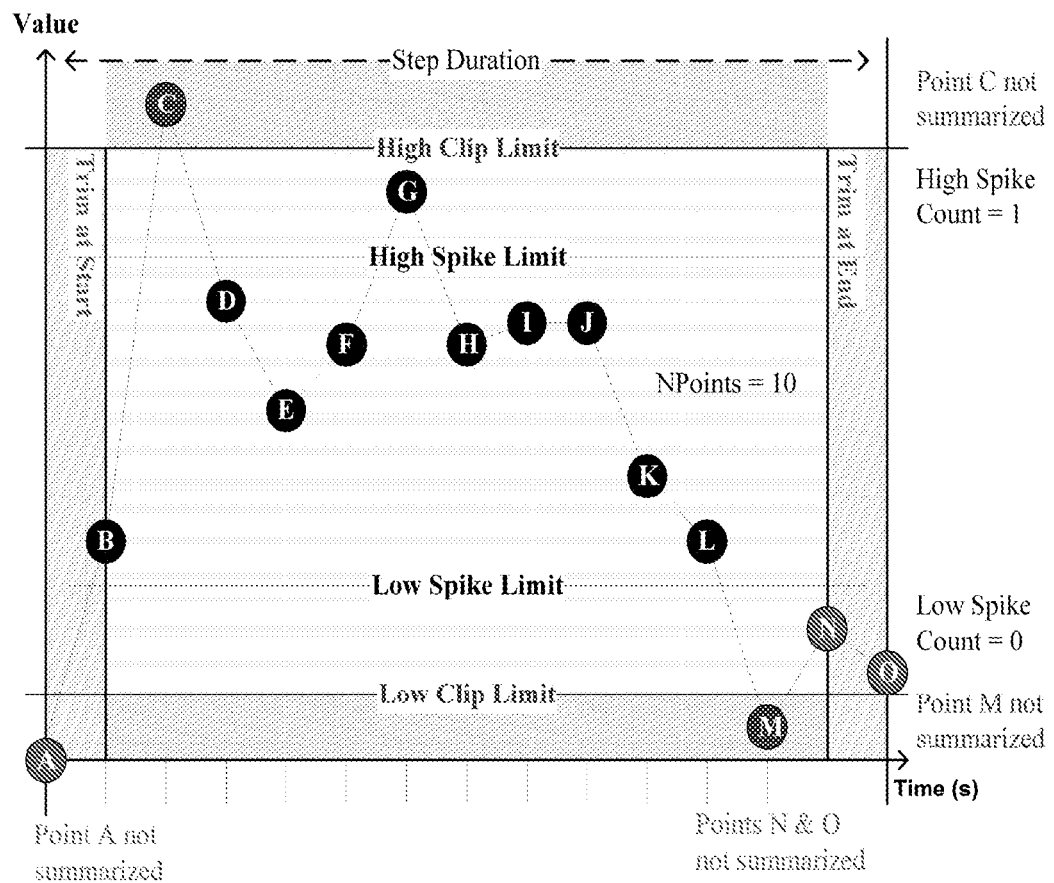
FIG. 10 shows an exemplary summary data creation process in accordance with one embodiment of the present invention.

An exemplary summary data creation process is shown in FIG. 10. In the illustrated example, trimming occurs for data points "A", "N" and "O" because data points where time in steps<step begin trim are discarded and because data points where time in steps>step end trim are also discarded. In the illustrated example, clipping occurs for data points "C" and "M" because data values that are greater than the clip limits are discarded and because data values that are less than the threshold limits are discarded. In addition, the High Spike count is one because there is one remaining data point "G" that is greater than the upper spike limit, and the lower spike count is zero because there are no remaining data points that are less than the lower spike limit.

In addition, a "Calculate statistic values" function can be used to calculate the following parameters: Maximum, Minimum, Average, and 3-sigma and save them in the database. In this case, it is necessary to have at least two points so that standard deviation of the parameters can be calculated. When there is less than two data points, NULL values can be entered.

In 438, a data collection process for a particular portion of the process can be completed. For example, the data collection process can be completed for a particular wafer or substrate. The wafer data can be put into an SQL file, and the SQL file can be placed into a database loader queue. Alternately, the data collection process can be completed for a group of products such as wafers or substrates.

Each data collection plan can have at least one data flow type assigned to it. Data flow types define what can be done with the data being collected. For example, a DATABASE_SAVE flow type can be used to specify the parameters to write to the database as well as the frequency and conditions under which those parameters can be written. The DATABASE_SAVE flow type is used to write data to the database so that it can be available for use in other data collection plans.

The following data flow types can be used:

a. FILE_RAWDATA flow type defines the conditions under which raw data can be written to an output file for external analysis.

b. FILE_SUMMARIES flow type defines the conditions under which summary data can be written to an output file for external analysis. Summary data for a given parameter can include four values for each recipe step: the average, 3-Sigma, maximum, and minimum.

c. SIMCA_P_RAW flow type defines the conditions under which raw data can be written to an output file for input to SIMCA-P for modeling and analysis.

d. Simca_P_SUM flow type defines the conditions under which summary data can be written to an output file for input to SIMCA-P for modeling and analysis.

e. TEL_STEP_SUM flow type is similar to the SIMCA_P_SUM flow type regarding the content of the output. However, the data in the output file can be ordered differently.

f. SPC (statistical process control) flow type defines the conditions under which summary data for a single parameter for a recipe step can be input to an SPC module for univariate analysis and SPC charting. The step summary data can be calculated using data saved to the database with a DATABASE_SAVE plan.

g. PCA_SPC flow type defines the conditions under which summary data for one or more parameters for a step can be input to the PCA (principle component analysis) module for multivariate analysis, after which it can be sent to an SPC chart.

For example, files generated by FILE_RAWDATA data types can contain raw sensor data for the specified parameters. Each row of the output file can contain a raw data entry based upon the output time specified in the plan. If the output time can be once per second, each consecutive row can contain raw data for each consecutive second that the wafer was processed.

In 440, analysis strategies can be determined by matching the current context. For example, an analysis strategy can be used to "analyze" data after collection, by using the data to create SPC charts, by using the data to perform multi-variate analysis (MVA), and using the data to execute judgment plans. After the end of data collection, the wafer context can be compared with the Analysis (Fault Detection Classification (FDC)) strategies, and proper strategies and plans can be identified. Plural strategies can be selected. The context search can be implemented using SQL statements. The identified strategies can be used to determine the analysis plan and judgment plan. Once an analysis strategy is identified, at least one data analysis plan and at least one judgment plan can be automatically determined.

An analysis strategy can be determined based on a process context. Analysis strategies define what happens during a set of sequences on the processing tool. Analysis strategies can define a set of sequences for a single wafer, a single tool, a single lot, or a combination of tool activities. For example, an analysis strategy record can contain context-matching information such as wafer-run, tool, chamber, recipe, slot, etc. Context information can be used to associate a given operation with another operation. In particular, the context information associates a process step or recipe with one or more strategies and/or plans. The context determines which strategy and/or plan is executed for a particular process recipe. For example, if a recipe contains a context term "Dryclean", then analysis strategies that have strategy records containing the "Dryclean" context string can be executed when the process tool runs processes with any recipe named "Dryclean".

For example, an analysis strategy can include one or more of the following: a file output plan, a SPC plan, a PCA plan, and a PLS plan. Analysis strategies can also include plans that can be executed at specific times. Common applications like tool health, cleaning timing, and seasoning completion can be implemented in many analysis plans. For example, a tool health plan can be executed for all wafer runs; a cleaning timing plan can be executed for a specific wafer run (i.e., 1st wafer run in a cassette or dummy wafer run); a seasoning completion plan can be executed for a seasoning (i.e., dummy wafer) run; a virtual etching state monitor plan can be executed for a production wafer run; a consumables plan can be executed for a specific wafer run (i.e., 1st wafer run in a cassette or dummy wafer run); and a chamber setup checks plan can be executed for a seasoning (i.e., dummy wafer) run.

In 442, analysis plans can be executed. In one embodiment, an "execute analysis strategies" module can receive a list of analysis plan IDs and judgment plan IDs from a "context matching" module, and can execute the analysis plans and the judgment plans one by one. For example, the "execute analysis strategies" module can include a loop structure to deal with plural analysis strategies, and this can be implemented using the hub.

In one embodiment, an "execute analysis plan" module can be called by the "execute FDC strategies" module, and the argument used can be an analysis plan ID. When the analysis plan is executed, an analysis plan setup can be extracted; one or more PCA plan (model) setups can be extracted; one or more PLS plan (model) setups can be extracted; SPC plan (chart) setups can be extracted; and rule setups can be extracted.

Analysis plans are portable and can be exported/imported to/from different computers at various customer and non-customer sites. In addition, action-masking functions can be provided so that end users can disable pause commands that may be included in some of the analysis plans.

Figure 11:
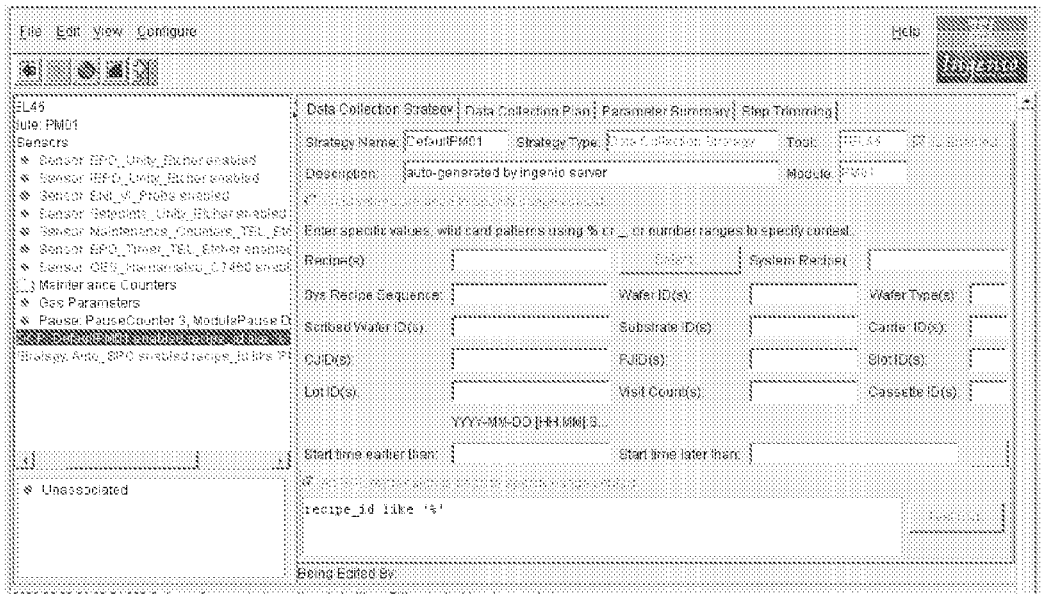
FIG. 11 shows an exemplary view of a Context selection screen in accordance with one embodiment of the present invention.

FIG. 11 shows an exemplary view of a context selection screen in accordance with one embodiment of the present invention. A context selection screen can be accessed when a new strategy is being created. For example, a context selection screen can be accessed by selecting a strategy folder on a data management screen.

As shown in FIG. 11, a context selection screen can comprise: a Name field that displays the name of the strategy; a Strategy Type field that displays the type of strategy; a Tool field that displays the tool; an Is Enabled check box that enables or disables this particular strategy; a Description field that displays a brief description of the strategy; a Module field that displays the number for the selected process module.

In addition a number of Usage Context Specification fields allow a user to select the usage context for the strategy. A user can select either Field values to specify usage context or a user can select an SQL expression to specify usage context. Also, a Recipe(s) field displays the process recipe. SELECT button allows the user to select a process recipe. A Lot ID(s) field displays the lot ID. A Wafer ID(s) field displays the wafer ID. A Start time later than field is used to display the start date for viewing processed wafer runs. A Start time earlier than field is used to display the end date for viewing processed wafer runs. Slot Number(s) field is used to display the slot number for the selected wafer. Cassette Number(s) field is used to display the cassette number for the selected wafer. A Show SQL button is used to create an SQL expression created from the information entered in the fields, and a Test SQL button is used to check the syntax for the SQL expression created from the information entered in the fields. A SAVE button allows a user to save strategy selections; an Undo button is used to erase a portion of the SQL expression, and a Close button is used to exit the screen without saving the strategy information.

The Context Selection screen can be used to create new control (data collection) strategies and/or analysis (data analysis) strategies.

In 444, SPC plans can be executed using definable analysis flow or context-based execution. For example, statistical process control can involve analyzing information gathered from the tool after the process has finished. Statistical process control can use statistical models to improve the quality of products and increase process efficiency while keeping costs low. SPC can be used to monitor a selected process after the wafer data have been collected. The purpose of monitoring the process can be to determine if the mean and distribution change over time.

After data are collected, summary data can be calculated and plotted on a chart as one point per wafer. The APC software can summarize data using step summary parameters. For example, after reviewing historical data, a process engineer can set the initial control limits and decide which run rules to apply to the process. After observing the process, the engineer may reset the limits as definable drifts occur.

SPC charts show data using step summary parameters. How this information is fed into the SPC charts defines the conditions under which summary data for a single parameter for a recipe step can be input to the SPC module for univariate analysis and SPC charting. The step summary data can be calculated using data saved to the database with a data collection plan.

In one embodiment, an "execute SPC charts" module can be called by an "execute analysis plan" module, and the argument can be a chart ID. For example, "QuMAP" can be used as an SPC application, and when "QuMAP" is executed, it plots T2, Q and predictable values. When SPC plans are executed, SPC alarms can be triggered.

In 446, PCA and PLS plans can be executed. Multivariate analysis involves the simultaneous analysis of multiple variables to make predictions about or understand an existing phenomenon. Univariate analysis involves monitoring one variable at a time. Although univariate analysis has been used to analyze various processes in the past, multivariate analysis has many additional benefits. The goal of multivariate analysis is to decrease the number of variables that must be monitored. Models are created so that model outputs can be monitored instead of having to monitor many variables at the same time. Multivariate analysis uses modeling as a way to show variations in processes on a run-to-run basis and to predict process and product parameters that are not measured constantly.

Principal component analysis (PCA) is a mathematical method used to examine the relationship among a set of n interrelated variables. This can be accomplished by changing the initial group of related parameters into new, unrelated variables. This new group, also known as principal components (PC), is a linear combination of the original set of variables in descending order of importance by variances. The first principal component represents a larger percentage of the variances present in the initial set of variables than in the subsequent sets.

The partial least squares method uses the same projection techniques as PCA, but partial least squares separates the data into inputs and outputs. PLS builds models using the same component structure as PCA to predict future outputs from only measured inputs. PLS outputs can be individually plotted on an SPC chart.

In one embodiment, an "execute PCA/PLS models" module can be called by "execute analysis plan" module and the argument used can be a PCA/PLS model ID. All PCA and PLS plans can be executed according to the template. Definable analysis flow can execute PCA/PLS models or SPC charts in accordance with the template and then decides the fault class using rule execution. SPC alarms may be triggered here.

For example, definable analysis flow can execute a certain PCA model by calling a subroutine. A PCA model or a PLS model can be executed by calling a subroutine that has one or more arguments, such as Model ID and Run ID. When the PCA subroutine executes, it can extract model setups from a table, calculate T2 and Q, store them into a table, plot points (=T2 and Q) in Qumap, and can return the model setups to definable analysis flow.

In 448, file output plans can be executed, and files can be stored. For example, file output plan formats can include: a FILE_RAWDATA file that can contain raw values versus runtime; a FILE_SUMMARIES file that can contain summary values sorted by parameters and step; a RUN_STEP_SUM file that can contain summary values as one line per step with extra context data; a RUN_SUM file that can contain summary values as one line per run with extra context data; a SIMCA_P_RAW file that can contain raw values versus runtime for import into Simca-P; a SIMCA_P_SUM file that can contain summary values as one line per run for import into Simca-P; and/or a TEL_STEP_SUM file that can contain summary values as one line per step.

Whether or not the file contains data for multiple wafer runs depends upon the naming convention for the file. For example, if the file name is the same as the plan name and if the Append New Data option is selected, the file can contain data for multiple runs. If the file name is the same as the process run ID, the file can contain data for a single wafer run. The individual data values on each row can be tab-delimited or comma-delimited so that the output file may be exported to a spreadsheet application. The first row of the output file can be a heading row and can contain the title of each data column in the file. Each subsequent row of the output file begins with run ID, followed by the observation, and the value of each parameter. A run ID can comprise one or more of the following items: wafer run start date, sequence number, process module, and tool ID. Each row of the output file can contain a raw data entry based upon the output time specified in the data collection plan. For example, if the output time is once per second, each consecutive row can contain raw data for each consecutive second that the wafer was processed.

For example, files generated by a "FILE_RAWDATA" plan can contain raw sensor data for the specified parameters. Files generated by a "SIMCA_P_RAW" plan can contain raw sensor data for the specified parameters. This data can be in a format that is specific to Simca-P. Simca-P summary files are designed to facilitate Simca-P modeling. Simca-P summary files may contain the mean value, the 3-sigma value, the minimum value, maximum value, the range, or a combination of these values for each parameter in a plan at each recipe step in the plan.

For example, files generated by a "FILE SUMMARIES" plan contain summary data for one or more wafers for the parameters that have been specified. The summary data for a parameter can comprise a minimum, maximum, average and 3-sigma value of that parameter over a wafer run. Summary output files typically contain data for multiple wafers; however, the content of the file can be based upon the name of the file. For example, if the filename is the same as the plan name and if the Append New Data option is selected, the file can contain data for multiple runs. If the filename is the same as the process run ID, the file can contain data for a single wafer.

Wafer summary calculations can be calculated from raw data gathered from the tool. The database stores raw data separately and is not modified when summary calculations are performed. Summary statistics are generally calculated by step from raw time series data and include the following information: minimum, maximum, mean, range, and standard deviation. The standard deviation can only be calculated if there are at least two data points. If less than two points remain, the standard deviation is not calculated.

Three data types can be used: a raw data type for source files; a time series data type for data that are collected periodically, typically once per second to create summary data; and a wafer step data type for summary data.

Trimming can be used when an analysis of only part of the raw data collected is needed. Trimming occurs when the first few seconds and the last few seconds of a process step are removed before the calculation is made. Trimming can be useful because it allows only certain parts of the data to be analyzed and prevents normal events, such as transients, from influencing the rest of the relevant data. Trimming is specified at the data collection plan setup. Time series data can be saved separately and are not altered in any way. Therefore, data removed by trimming are not used to calculate summary parameters but can be still stored as raw data.

Low clip and high clip can be executed to delete questionable data points (for example, negative values on mass-flow meter). Low clip and high clip can be defined by parameter, by step, and by set point. Data points that are greater than the high clip limit are not included in summary calculation. Data points that are less than the low clip limit are not included in summary calculation.

Spike counting can be included in summary calculation. The spike count considers data points as follows: Those that are higher than the Upper Spike Limit (USL) are considered upper spike; and those that are lower than the Lower Spike Limit (LSL) are considered lower spike.

Upper spike and/or lower spike data points can be counted separately by step and by parameter. When data points exceed the USL or LSL continuously, every point can be counted as a spike. Spiked points are not discarded from summary calculation. Counted values of "high spike" and "lower spike" are saved to the database and can be extracted in a summary output file so that they can be fed into a Principle Component Analysis model, a Partial Least Squares model, or an SPC chart. When USL and LSL are defined by "percentage value", the "spike count" function uses the recipe set points at run time.

A set point can be derived from a process recipe. Parameters that are specified in the process recipe, such as RF_FORWARD and GAS_FLOW, can have set points. Parameters from external sensors, such as OES sensors and EPD sensors, may or may not have set points.

Summary calculation (trim, low clip, high clip, max, average, min, 3-sigma, range) and database save can be executed once per wafer.

The data flow type defines the conditions under which summary data can be written to an output file. Summary data for a given parameter consists of four values for each recipe step: the Average, 3-Sigma, Maximum and Minimum.

The first row of a summary output file can be the heading row. It can contain the title of each data column in the file. Each subsequent row begins with the run ID, followed by the parameter name, the recipe step at which data collection began, and then the summary values: minimum, maximum, average, and 3-sigma for that parameter.

SPC plans display summary parameters on charts. PCA and PLS plans take summary data and enter the data into models. The data generated from the models can be displayed in a series of SPC charts.

Models can be used to view abnormalities and normal drifts that occur during wafer processing. When an abnormality or drift is discovered, steps can be taken to stop or adjust the process to bring it back within normal levels. Unlike in univariate monitoring, after a fault is detected, the engineer can take the current data to the model and have more guidance to bring the process back under control. Data collected using APC can be imported directly into third party modeling software programs to create models using the data. The models can be exported to the APC server for fault detection and parameter prediction.

Summary data information can also be used for multivariate analysis. The method used for feeding summary data into models defines the conditions under which summary data for one or more parameters for a step can be input to the principal component analysis (PCA) model or partial least squares (PLS) model for multivariate analysis. The model output parameters can then be sent to SPC charts.

In 450, data can be stored. In one embodiment, data collected in the system flows through a set of steps between the real-time sensor collection and the database storage. Data collected from the sensor can be first loaded into the data hub. The data hub can provide a physical location for the data to be processed by different algorithms defined by the user through the control and analysis strategies and by scripts.

The data hub can contain the data collection plans. The data hub interacts with the APS system to select the appropriate data collection plan needed. The data hub can contain data configuration plans, filters data based on configuration plans to the database, calculates summary data based on specifications in configuration plans and places summary data into the database. The data hub can provide SPC charts with summary data and can send email if a run rule violation occurs, can provide PCA and PLS models with summary data, and can provide the resulting parameters into SPC charts and into the database.

In one embodiment, the summary data in the database can be read-only data, and there will be no way to change it once it is calculated at runtime. For example, one or more user terminals connected to the APC system can have the ability to recalculate the summary data in the database based on raw data in the database and a configurable plan. Copying raw data files can be one way to recalculate summary data using different trims, clips, etc. and update the database.

Files successfully loaded into the database can be moved from the input directory to an archive directory. These can be SQL files that have been processed and placed in the database. For example, these files can be saved until the database has been backed up. If the system failed before the daily backup, these files could be placed in a loader_input directory and the current day of data would be reloaded. The archived file can be used to transfer data between machines. Another method can use data preparation and export SQL files.

For example, data loading can be done via a TCL interface. The plans setup by the users define the data and the data parameters to be loaded by the data hub to the database.

Error data handling can also be performed by the software. Errors from processing of data that have already been loaded can be trapped and reported as warnings in a trace table. A trace log file can contain any errors generated by the data hub loading. An errors log file can contain any database SQL errors or any other errors that TCL could not handle. Error messages can be returned if load fails due to files or parameters missing.

For example, a data hub can use TCL/Tk processes that can be started at system boot. First, there can be an SQLsrv process whose role can be to provide connectivity to the persistent database on behalf of a message system client. A second process can be a batch loader process whose role can be to manage and process files of SQL statements containing the data of process runs. These processes can be programmed to shut down if a connection to the data hub is lost.

A data hub (loader) process can be started during its initialization at system boot time. The data hub manages and oversees the processing of files that contain plain text SQL statements representing the data of process runs. Each file can contain all the data of a single process run. In this standard format, the file data can be input into the data hub or into any SQL database.

After processing the wafer, the loader can be called to load the wafer into the database in the background. For example, this can be different for different runs as defined by the data collection plan. In some cases, scripts would write all the data out, and in other cases, scripts would only write a subset of data. The loader can be told to process specific input files by sending TCL code along with a list of file(s) as an argument. During the execution of this command, the loader executes a database utility to load the specified SQL data files into the database. The loader analyzes the output of the utility for errors. Results can be reported as the return value of the procedure call and can also be reported to the DMH trace facility.

The data management tables can be implemented in the DMH as in-memory tables and in the database as persistent storage. DMH can provide a limited set of SQL for column and row creation as well as posting data to the tables. The tables can be duplicated in the persistent database and can be populated using the same SQL statements. The software interface to the tables can be provided by a combination of TCL and SQL code.

Posting of data to the database can be provided by a loader process, operating in the background, that sends SQL commands from a file to the database. Transfer of data from the in-memory tables to the persistent tables can be accomplished by writing SQL to a file and placing the file in the loader directory. After the SQL has been executed, the file can be automatically deleted from the loader directory.

Raw data from the sensors such as the OES and the VIP, and trace data from the tool can be stored as files in the APC server. The amount of data depends on the data collection plans configured by the user, as well as the frequency with which the tool is run. In addition, other data can be stored as logs and post-processing files on the server. Therefore, one purpose of the data management component can be to allow an advanced user to manage the APC server files to maintain the collected data without having the server run out of disk space. File Maintenance may be available in the APC server and not in the workstation delivered with the server.

In 452, Backup, Archive, Delete, Recover, and Restore (BADRR) functions can be executed. For example, a BADRRGUI module can provide an interface for running a series of BADRR commands without affecting the way in which the periodic database maintenance operations work. A BADRR configuration file can be used to determine how periodic database maintenance configuration works, and running the BADRRGUI module does not modify the parameters specified in the BADRR configuration file. A "BADRRGUI Periodic" module can provide a Graphical User Interface into the most commonly used configuration parameters found in the BADRR configuration file. Changes done within the "BADRRGUI Periodic" module can modify the BADRR configuration file, and therefore can affect subsequent periodic database maintenance operations. The BADRRGUI module can contain several panels that the user interacts with to determine how the data is to be processes. A backup function can be used to determine what data should be backed up (backup data consists of configuration data only not run wafer data). The archive function determines the data that should be archived. The delete function can determine what data should be deleted and process them one run ID at a time. Data can only be deleted after it has been archived. The restore function can take the current file stored in the backup directory, unzip it to a work directory and restore each table according to the file name. The retrieve function can take the selected file stored in the archive directory and process each file individually, unzip the file to the work directory and retrieve each table according to the file name. The reindex function can collect current statistics on tables and indexes; this can provide the optimizer with the most accurate information with which to determine the best access plan when retrieving data. The reorg function reorganizes a table by reconstructing the rows to eliminate fragmented data, and by compacting information.

In 454, data can be displayed. In one embodiment, data displaying can include displaying status screens to the user, displaying setup/configuration screens to the user, displaying charts to the user, and displaying alarm information (intervention information) to the user.

Figure 12:
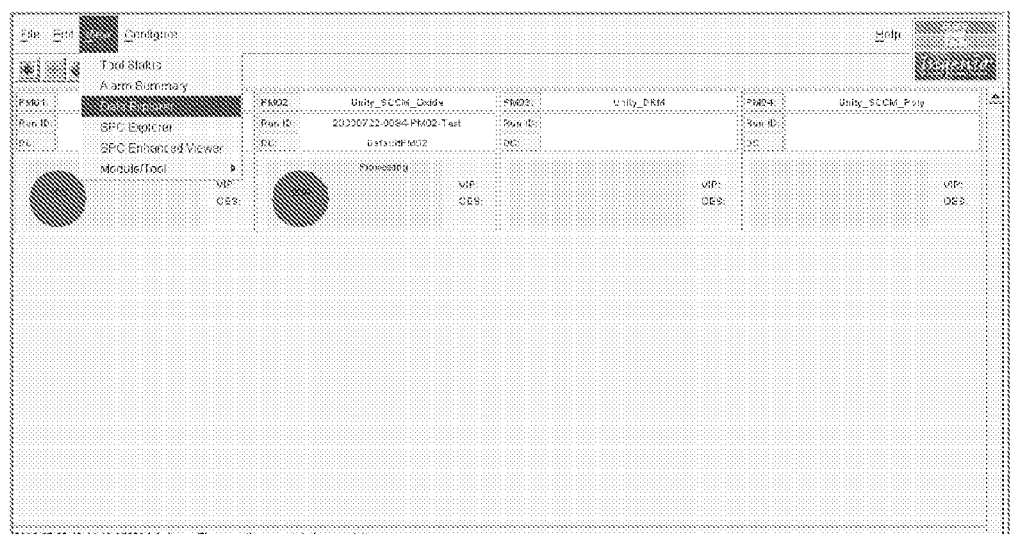
FIG. 12 shows an exemplary view of a Tool Status screen in accordance with one embodiment of the present invention.

Status data can be displayed using at least one GUI screen. For example, tool status data can be displayed using a GUI screen as shown in FIG. 12. Alternately, other status data can be displayed using other GUI screens. In the illustrated embodiment, tool status screen comprises Title Panel, Information Panel, and Control Panel. In the Information Panel, current information can be displayed for each process module on this screen. Chamber field can comprise at least one process module name. Information about the wafer currently in the process module can be displayed in the Lot ID, Cassette, Recipe ID, and Plan fields. Lot ID can be the ID of the lot to which the wafer in the module belongs. Cassette can be the ID of the cassette from which the wafer came. Recipe ID can be the ID of the recipe for the current wafer. Plan can be the name of the data collection plan executed on the current wafer. Process module panels contain text and graphics to indicate the status of key elements of the module.

Figure 13:
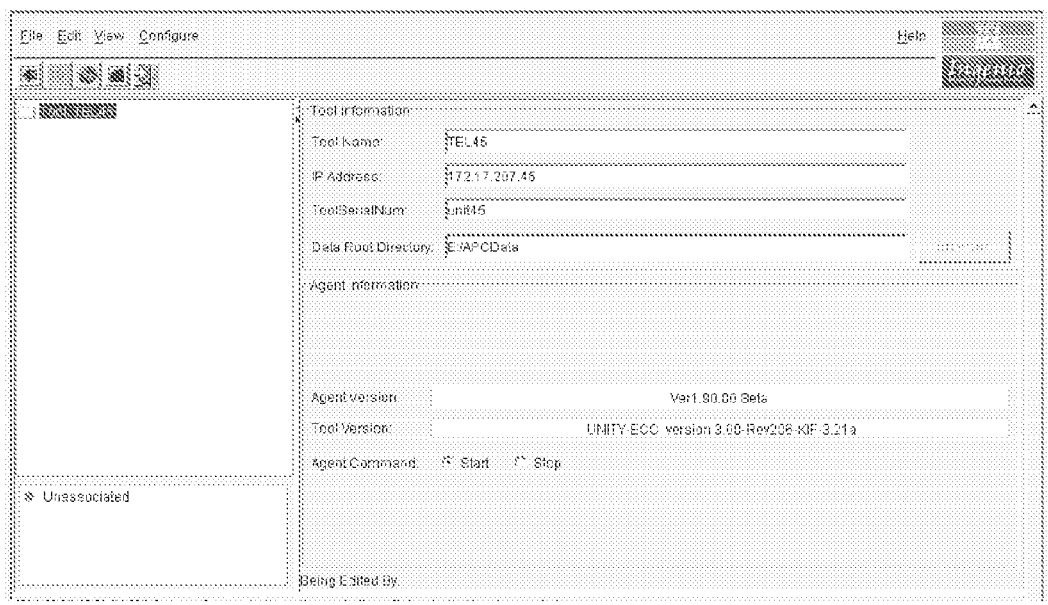
FIG. 13 shows an exemplary view of a System Configuration screen in accordance with one embodiment of the present invention.

Setup and configuration data can be displayed using at least one GUI screen. For example, tool configuration data can be displayed using a GUI screen as shown in FIG. 13. Alternately, other setup and configuration data can be displayed using other GUI screens. In the illustrated embodiment, system configuration screen comprises Title Panel, Information Panel, and Navigation Panel. In the Information Panel, current information can be displayed for the tool. A navigation panel allows the user to select tool and chamber information, and a user can use the navigation panel to view or edit parameters for the probes associated with the tool. In an alternate embodiment, a configuration screen can comprise a title panel, information panel, and control panel.

Figure 14:
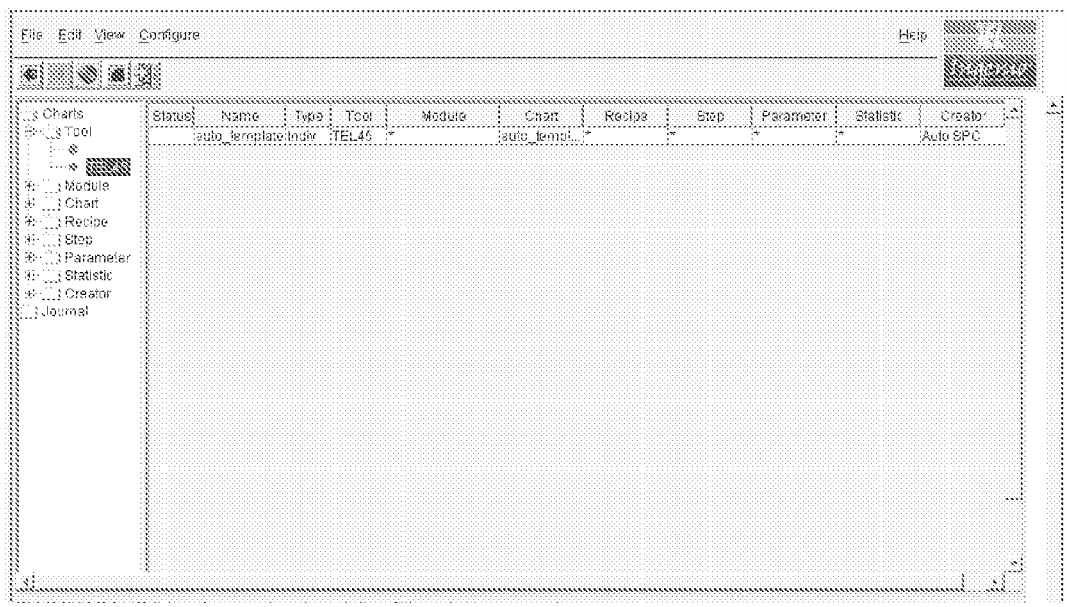
FIG. 14 shows an exemplary view of a Chart Selection screen in accordance with one embodiment of the present invention.

Data can be displayed using one or more charts and charting functions can be used to display data using at least one GUI screen. For example, charts can be configured, edited, and viewed using at least one GUI screen. An exemplary view of a chart selection screen is shown in FIG. 14. In the illustrated embodiment, chart selection screen comprises Title Panel, Information Panel, and Navigation Panel. In the Information Panel, current information can be displayed for the chart. A navigation panel provides a means for displaying different chart types.

Figure 15:
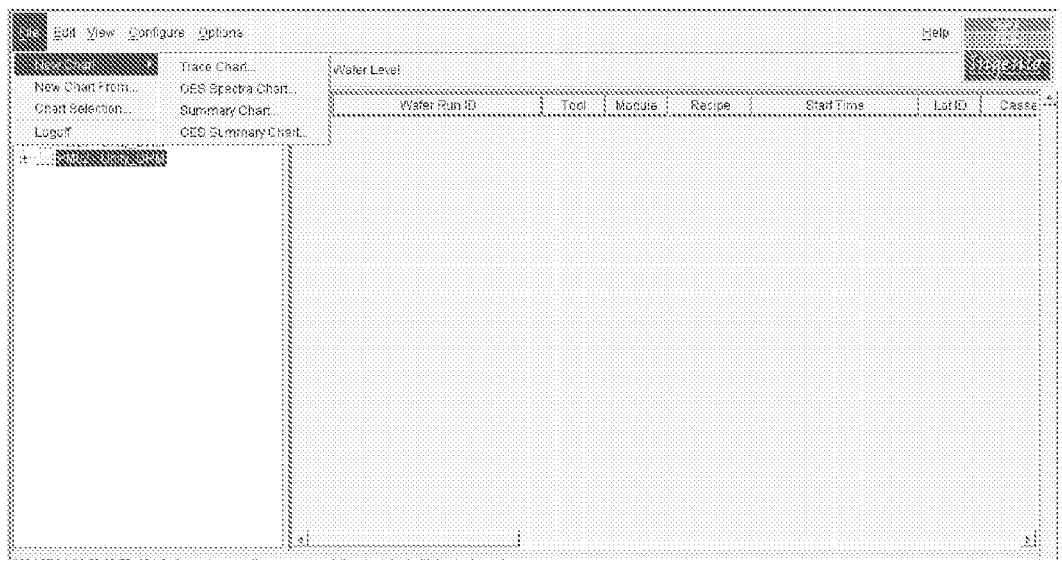
FIG. 15 shows an exemplary view of another chart selection screen in accordance with one embodiment of the present invention.

FIG. 15 shows an exemplary view of another chart selection screen in accordance with one embodiment of the present invention. A user can access a trace chart, OES spectra chart, a summary chart, or a OES summary chart from this chart selection screen.

Figure 16:
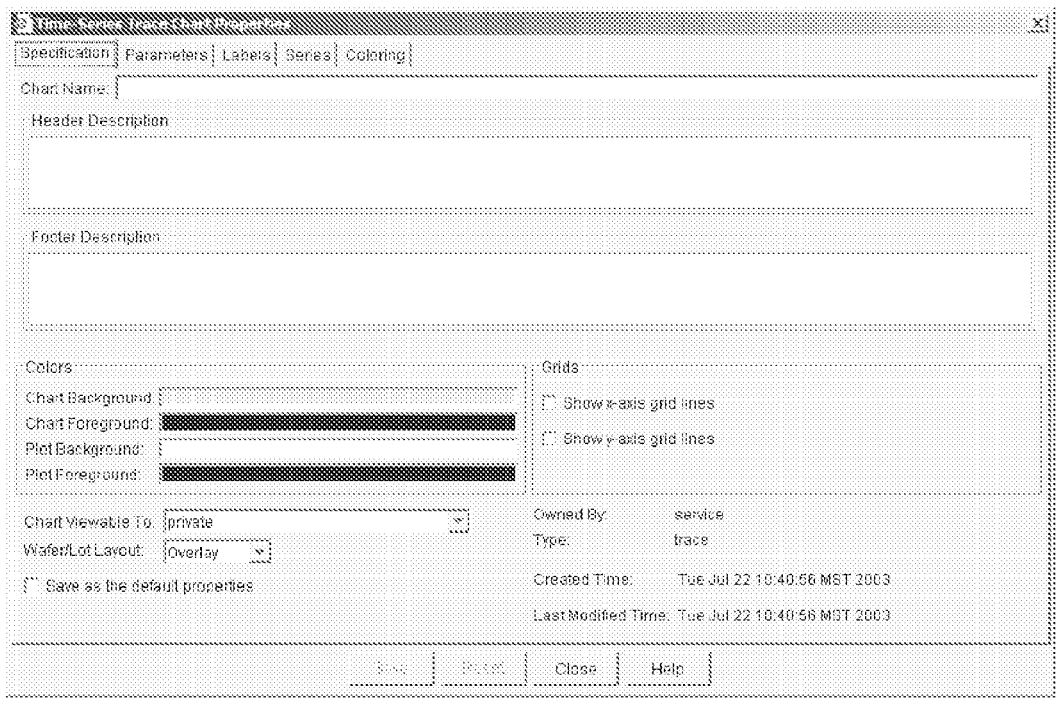
FIG. 16 shows an exemplary view of a trace chart configuration screen in accordance with one embodiment of the present invention.

FIG. 16 shows an exemplary view of a trace chart configuration screen in accordance with one embodiment of the present invention. A user can access a parameters tab screen from a chart selection screen. A parameters tab screen can enable a user to select parameters to include on the chart. A labels tab screen can enable a user to select labels to include on the chart. A series tab screen can enable a user to select series to include on the chart. A coloring tab screen can enable a user to select colors to use on the chart.

Figure 17:
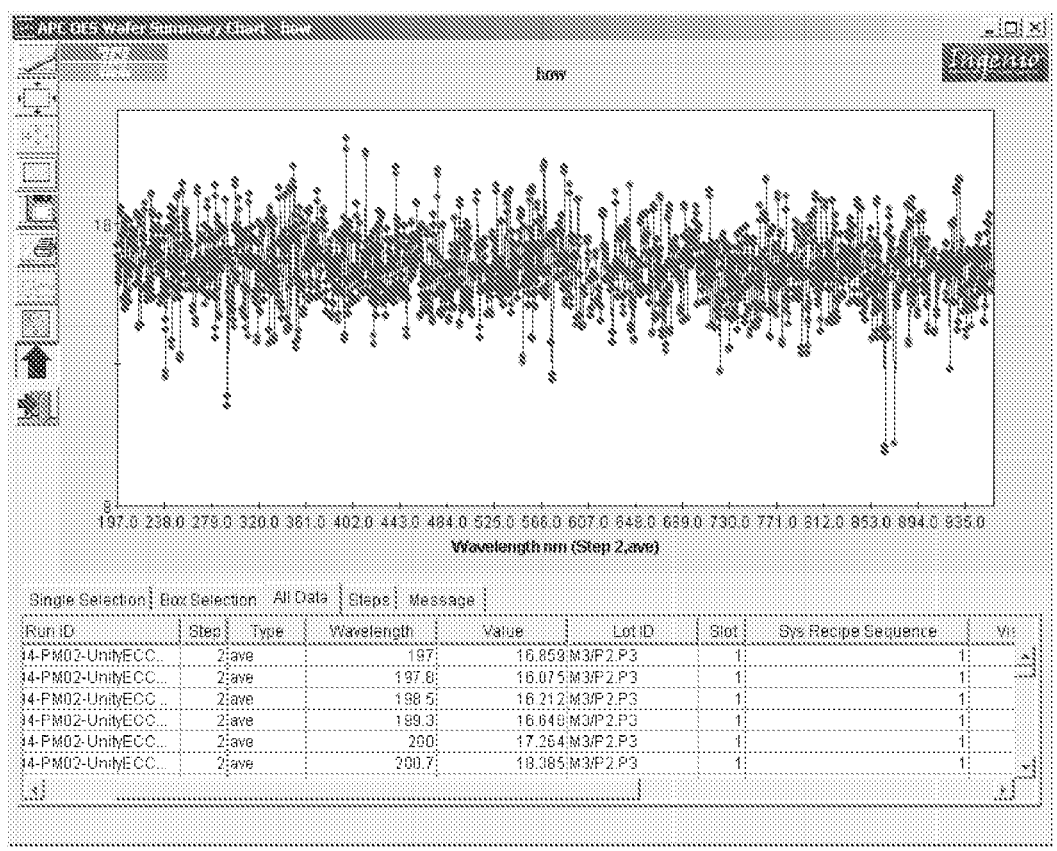
FIG. 17 shows an exemplary view of a wafer summary chart screen in accordance with one embodiment of the present invention.

FIG. 17 shows an exemplary view of a wafer summary chart screen in accordance with one embodiment of the present invention. For example, a user can access a wafer summary chart screen from a chart selection screen. A wafer summary chart screen can enable a user to view selected parameters on a chart. On a wafer summary chart screen, parameters associated with the wafers previously selected can be plotted. The charting function can be performed using SQL statements. Summary charts can be edited, deleted, and saved. In addition, a chart from another user can be saved using a "SaveAs" selection.

Figures 18A, 18B:
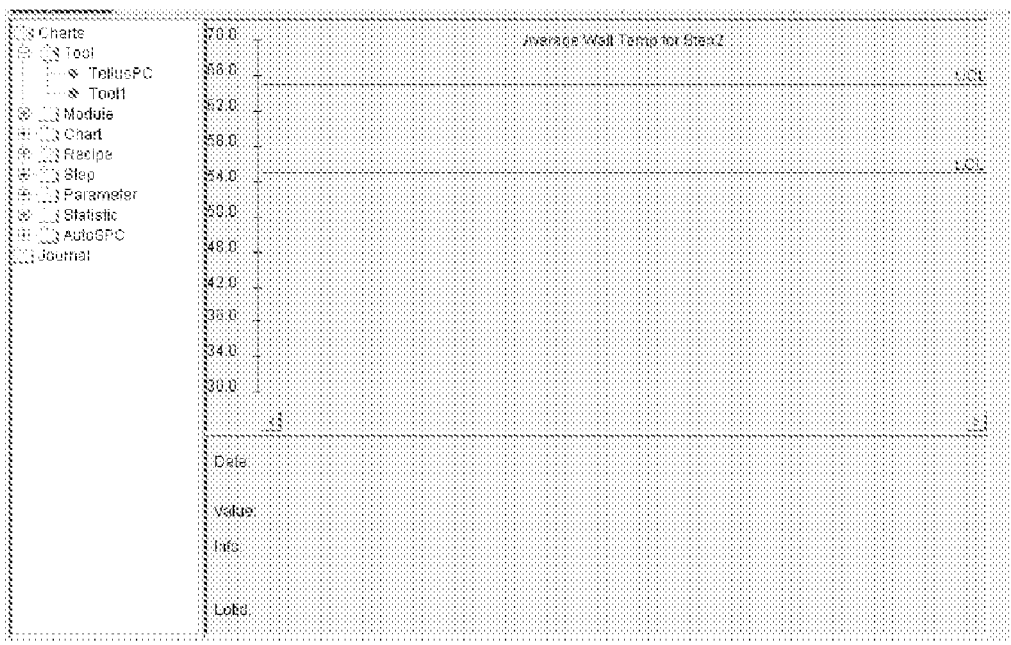
FIGS. 18A and 18B show an exemplary view of a chart selection screen and an exemplary view of the selected chart in accordance with one embodiment of the present invention.

FIGS. 18A and 18B show an exemplary view of a chart selection screen and an exemplary view of the selected chart in accordance with one embodiment of the present invention.

Figures 19A, 19B:
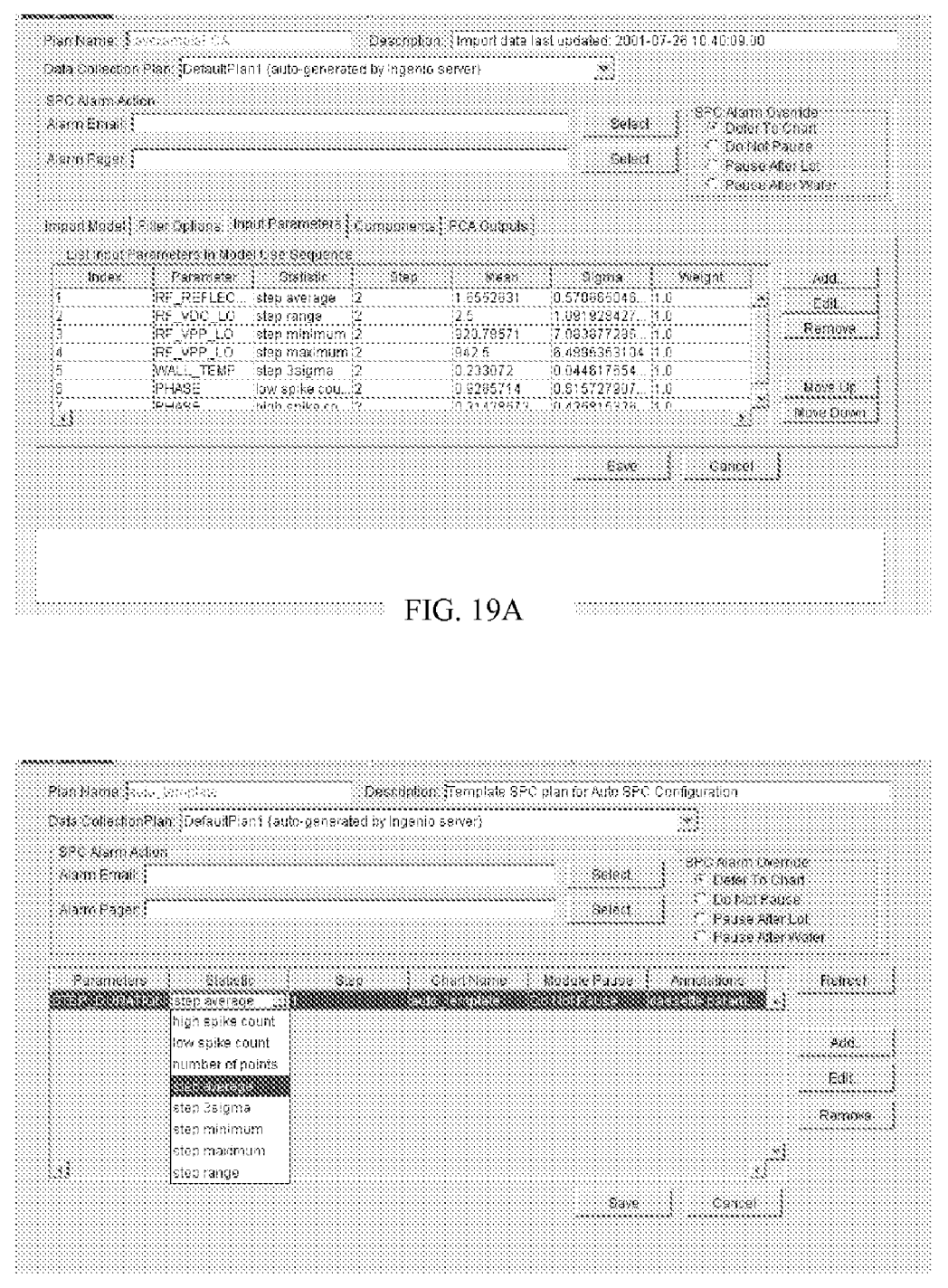
Figure 19C:
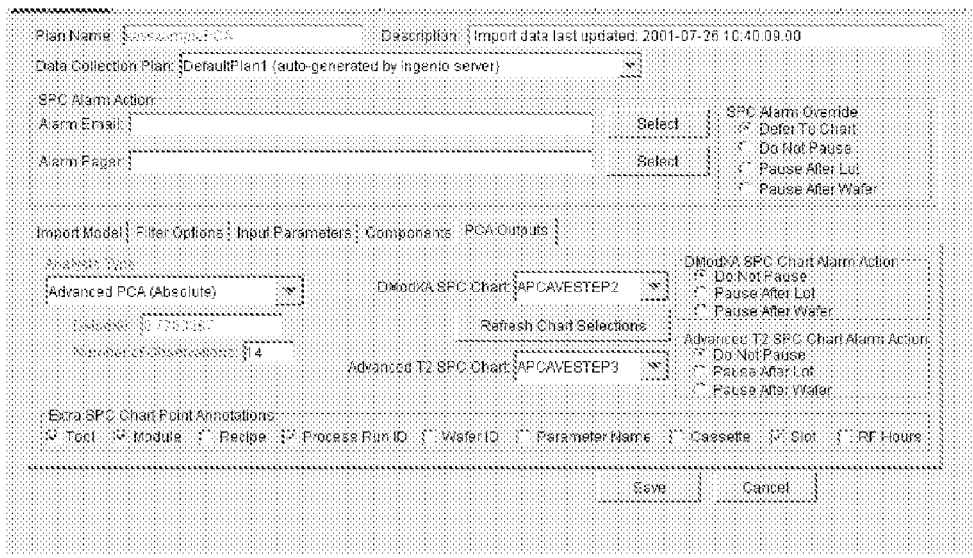

FIGS. 19A-19C show exemplary views of PCA plan panels in accordance with one embodiment of the present invention. For example, a PCA SPC plan can be used to determine which data is presented in PCA SPC charts and how alarms are to be processed. In FIG. 19A, a navigation tree is shown, but this is not required for the invention. Alternately, other selection means can be used such as selection tabs, lists, or buttons. A drop-down lists can be shown in that allow a user to create a new PCA SPC plan, edit a PCA SPC plan, save a PCA SPC plan, delete a PCA SPC plan, associate a PCA SPC plan, unassociated a PCA SPC plan, import a PCA SPC plan, export a PCA SPC plan, and perform data preparation. Alternately, other selection means can be used such as selection tabs, menu items, check boxes, or buttons.

The APC system and the APC software auto-generates at least one default PCA SPC plan when the APC system and APC software is configured. The auto-generated PCA SPC plans can be used to operate the system or serve as an example for a process engineer to use to setup a different PCA SPC plan.

For example, the PCA SPC plan panels can comprise at least one of: a plan name filed, a plan description field, a data collection plan name field a SPC alarm action field, an import/export sub panel, a parameters sub panel, a components sub panel, and a PCA outputs sub panel.

A PCA SPC plan folder, such as "PCA SPC plans" can be opened to display one or more specific SPC plans, such as an example PCA plan. In FIG. 19A, a single PCA SPC plan is displayed, and selection means are available that allow a user to display a PCA SPC plan setup panels as shown in FIGS. 19B-19C. For example, these panels can be displayed using a mouse button or a sequence of keystrokes.

Figure 20A:
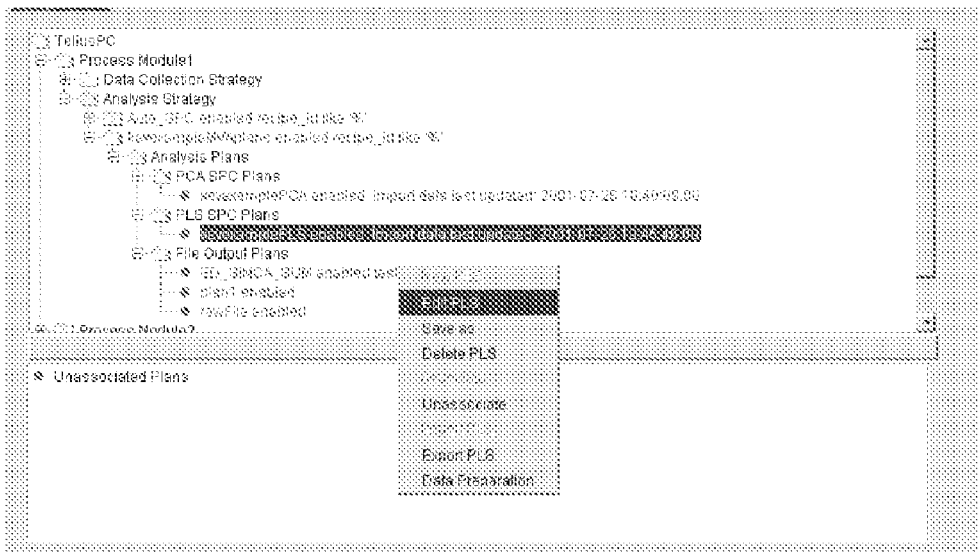
Figures 20B, 20C:
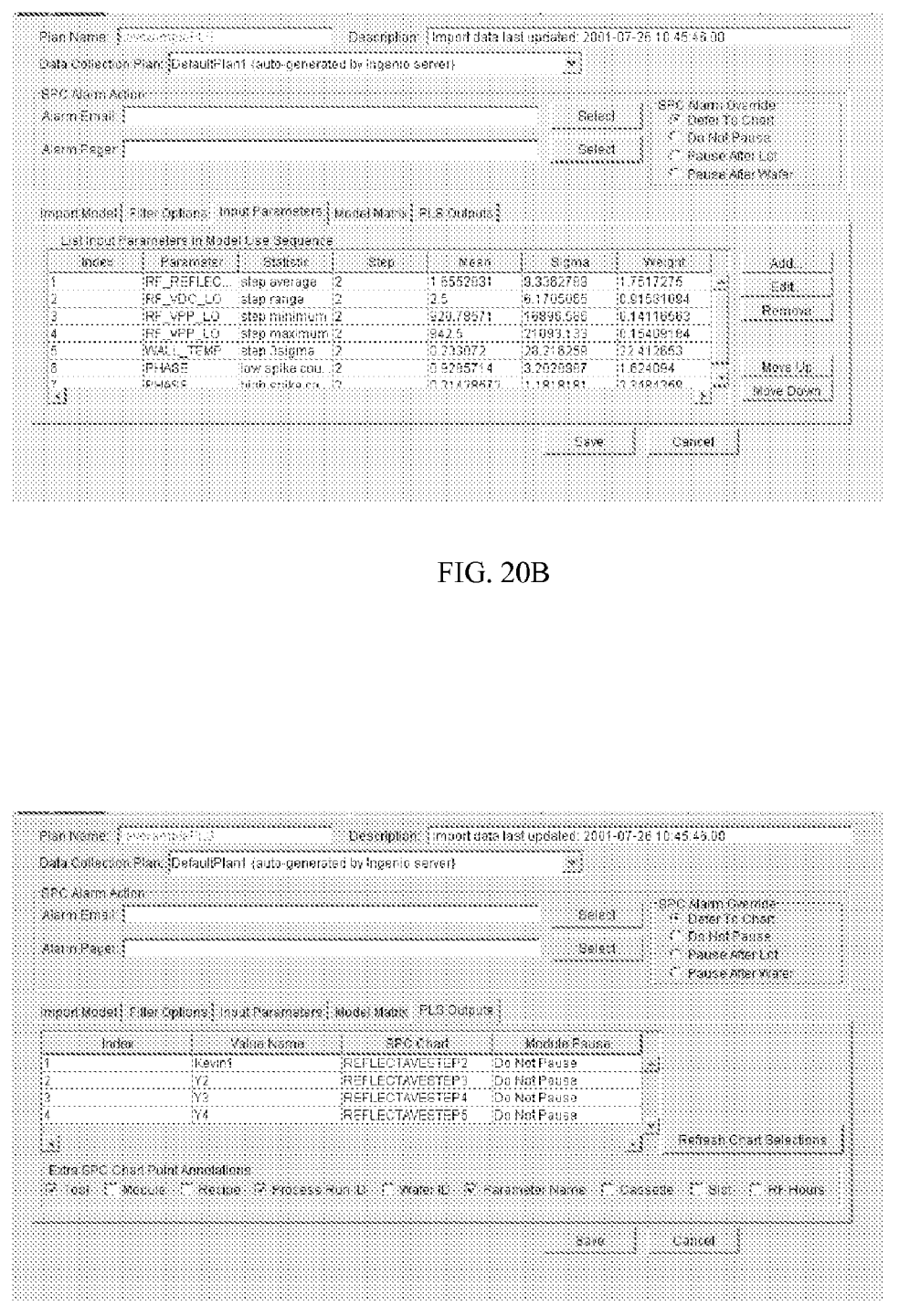

FIGS. 20A-20C show exemplary views of PLS plan panels in accordance with one embodiment of the present invention. For example, a PLS SPC plan can be used to determine which data is presented in PLS SPC charts and how alarms are to be processed. In FIG. 20A, a navigation tree is shown, but this is not required for the invention. Alternately, other selection means can be used such as selection tabs, lists, or buttons. A drop-down lists can be shown in that allow a user to create a new PLS SPC plan, edit a PLS SPC plan, save a PLS SPC plan, delete a PLS SPC plan, associate a PLS SPC plan, unassociated a PLS SPC plan, import a PLS SPC plan, export a PLS SPC plan, and/or perform data preparation. Alternately, other selection means can be used such as selection tabs, menu items, check boxes, or buttons.

The APC system and the APC software auto-generates at least one default PLS SPC plan when the APC system and APC software is configured. The auto-generated PLS SPC plans can be used to operate the system or serve as an example for a process engineer to use to setup a different PLS SPC plan.

For example, the PLS SPC plan panels can comprise at least one of: a plan name filed, a plan description field, a data collection plan name field a SPC alarm action field, an import/export sub panel, a filer options sub panel, an input parameters sub panel, a model matrix sub panel, and a PLS outputs sub panel.

A PLS SPC plan folder, such as "PLS SPC plans" can be opened to display one or more specific SPC plans, such as an example PLS plan. In FIG. 20A, a single PLS SPC plan is displayed, and selection means are available that allow a user to display a PLS SPC plan setup panels as shown in FIGS. 20B-20C. For example, these panels can be displayed using a mouse button or a sequence of keystrokes.

Figure 21A:
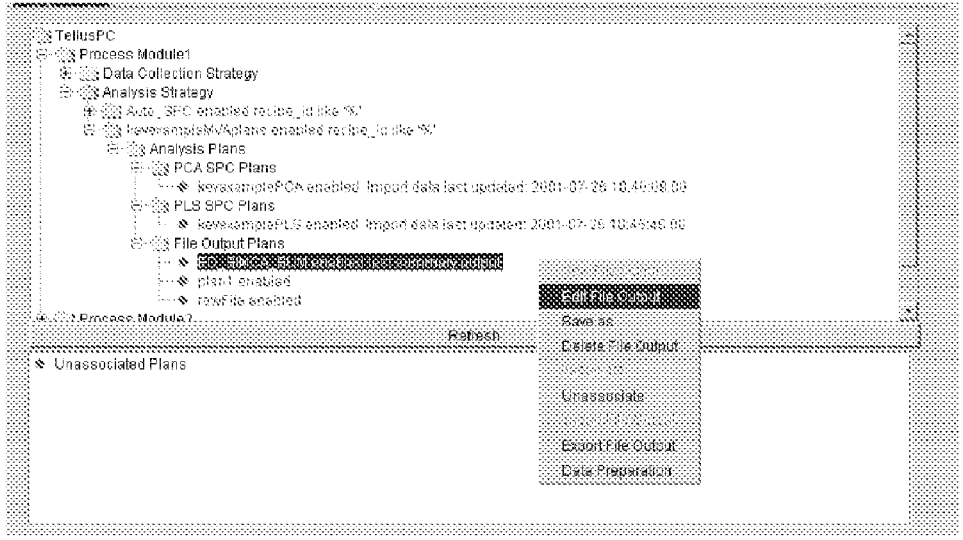

FIGS. 21A-21E show exemplary views of file output plan panels in accordance with one embodiment of the present invention. For example, a file output plan can be used to determine which data is presented in raw data files, summary data files, and Simca-P summary files. In FIG. 21A, a navigation tree is shown, but this is not required for the invention. Alternately, other selection means can be used such as selection tabs, lists, or buttons. A drop-down lists can be shown that allow a user to create a new file output plan, edit a file output plan, save a file output plan, delete a file output plan, associate a file output plan, unassociated a file output plan, import a file output plan, export a file output plan, and perform data preparation. Alternately, other selection means can be used such as selection tabs, menu items, check boxes, or buttons.

The APC system and the APC software auto-generates at least one default file output plan when the APC system and APC software is configured. The auto-generated file output plans can be used to operate the system or serve as an example for a process engineer to use to setup a different file output plan.

For example, the file output plan panels can comprise at least one of: a plan name filed, a plan description field, a data collection plan name field, a file format type field, a parameters sub panel, a sampling rate sub panel, a steps sub panel, a summary processing sub panel, and a file output sub panel.

Figure 21B:
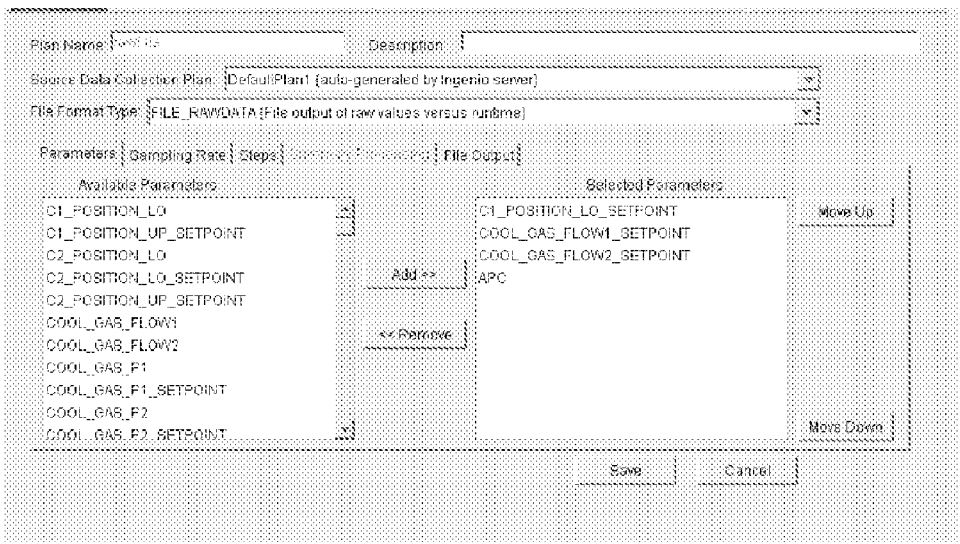
Figure 21C:
Figure 21D:
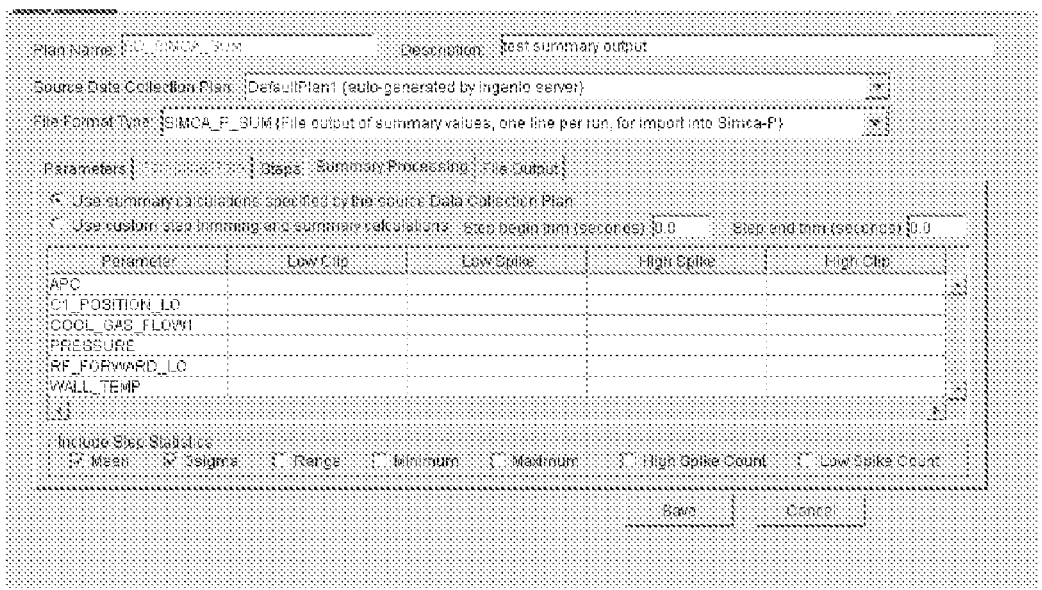
Figure 21E:
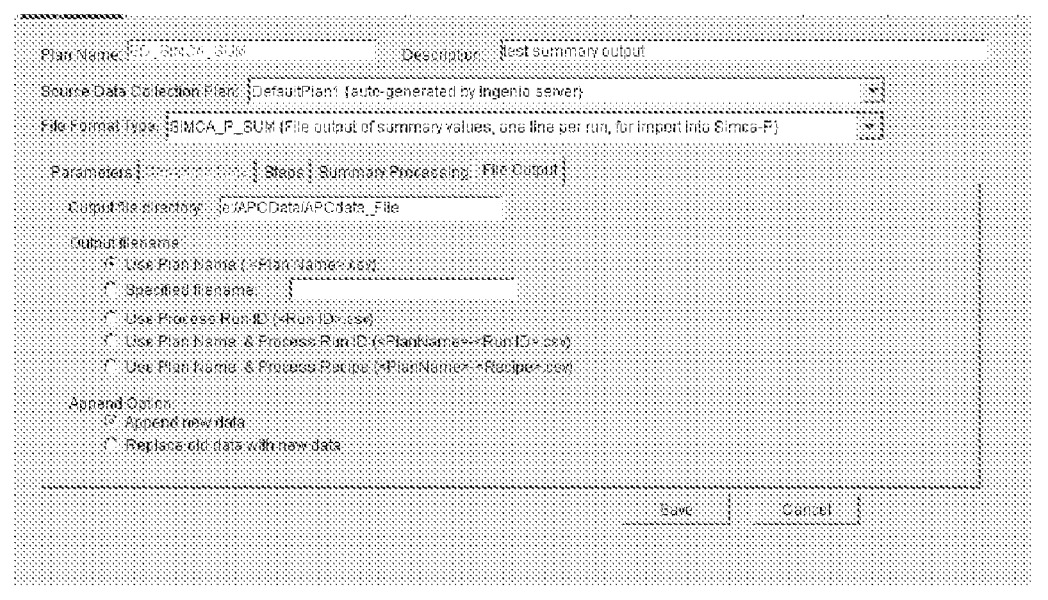

A file output plan folder, such as "File Output plans" can be opened to display one or more file output plans, such as a raw data file plan, a summary data file plan, or a Simca-P summary file plan. In FIG. 21A, three different file output plans are displayed, and selection means are available that allow a user to display the file output plan setup panels as shown in FIGS. 21B-21D. For example, these panels can be displayed using a mouse button or a sequence of keystrokes.

Files generated by raw data file plans contain raw sensor data for the specified parameters. Each row of the output file contains a raw data entry based upon the output time specified in the data collection plan. For example, if the output time is once per second, each consecutive row will contain raw data for each consecutive second that the wafer was processed.

Files generated by a summary data file plan contain summary data for one or more wafers for the parameters that have been specified. The summary data for a parameter is comprised of the minimum, maximum, average and $3\sigma$ value of that parameter over a wafer run. Summary output files typically contain data for multiple wafers; however, the content of the file is based upon the name given the file.

Files generated by Simca P_raw data plans contain raw sensor data for the specified parameters. This data is in a format that is specific to Simca-P. Each row of the output file contains a raw data entry based upon the output time specified in the plan. For example, if the output time is once per second, then each consecutive row will contain raw data for each consecutive second that the wafer was processed. Whether or not the file contains data for multiple wafer runs depends upon how you name the file.

In addition, Simca-P summary files and file plans are designed to facilitate Simca-P modeling. For example, Simca-P summary files may contain the mean value, the 3-sigma value, the minimum value, maximum value, the range, or a combination of these values for each parameter in a plan at each recipe step in the plan.

As described above, the GUI is web-based and is viewable by a user using a web browser. The GUI allows a user to display real-time tool and process module statuses based upon process module events and alarm messages, historical data numerically and/or graphically, SPC charts, APC system logs, and Alarm logs. In addition, the GUI allows a user to print graphs and reports, to save data to files, to export data, to import data, and set up or modify the system.

GUI screens can comprise at least one of a title bar, a navigation bar, a selection bar, a control bar, a message bar, and a GUI panel. Bars can be located along the bottom and/or top of the GUI panels, and these bars can comprise selection items that allow users to navigate between screens and/or panels without having to traverse a series of menus. Desirably, a means for logging off is displayed on at least one screen/panel. In addition, reminder messages can be provided when data has been modified and not saved. In addition, a means for obtaining help can be displayed, and it can be used to view content specific and general documentation to aid the user understand the data being presented to the user and/or the data being requested from the user. Furthermore, a GUI component can comprise at least one screen selected from a group consisting of an English language screen, a Japanese language screen, a Taiwanese language screen, a Chinese language screen, a Korean language screen, a German language screen, and a French language screen. Procedure 400 ends in 456.

The data management component of the APC system can also perform dummy wafer data collection and any other process data collection that is necessary for analyzing data from a tool during times when the tool is being stabilized, monitored for processing, or during seasoning. Dummy wafers can be used during these types of processing to avoid loss of production wafers.

Those skilled in the art will recognize that the left-to-right selection tab structure can be replaced with a right-to-left structure, a bottom-to-top structure, a top-to-bottom structure, a combination structure, or any other structure. Those skilled in the art will recognize that the selection tabs structure can be replaced with a navigation tree structure or any other structure. In alternate embodiments, function buttons can be located along the bottom of all GUI screens. Pop-up reminders can be provided when data has been modified and not saved. The Help screens can be used to view content specific and general documentation to aid the user understand the data being presented to the user and/or the data being requested from the user.

Numerous modifications and variations of the present invention are possible in light of the above teachings. It is therefore to be understood that, within the scope of the appended claims, the invention may be practiced otherwise than as specifically described herein.

What is claimed is:

1. A method for managing data in a semiconductor processing environment, the method comprising:
    collecting raw data during a process from one or more processing tools, each having one or more process modules, wherein the raw data includes maintenance counter data;
    receiving trace file data and process log file data from the one or more processing tools;
    synchronizing the raw data with the trace file data and process log file data to create wafer data, wherein time synchronization is used to relate the wafer data to recipe steps;
    calculating summary data from the raw data using time series data files;
    creating a plurality of files containing the wafer data and the summary data, the plurality of files consisting of Alert files, DbArchive files, Event files, Raw files, and RawIndex files; and
    storing the plurality of files in a real-time database using a subscription server, the real-time database including multiple data hubs.

2. The method as claimed in claim 1, further comprising:
    executing at least one analysis strategy determined using current context data; and
    executing at least one of an analysis plan, a SPC plan, a PLS plan, a PCA plan, a raw file output plan, a summary file output plan, and judgment plan.

3. The method as claimed in claim 2, further comprising storing the wafer data in an SQL database using a first context matching strategy.

4. The method as claimed in claim 2, further comprising executing at least one of a data backup function, a data archive function, a data delete function, a data recover function, and a data restore function using a first context matching strategy.

5. The method as claimed in claim 2, further comprising at least one of: displaying status data using at least one GUI screen, displaying setup data using at least one GUI screen, displaying configuration data using at least one GUI screen; displaying wafer data using at least one GUI screen, and displaying trace parameter data using at least one GUI screen using a first context matching strategy.

6. The method as claimed in claim 1, wherein the collecting of raw data comprises:
    receiving context information including a list of multiple control strategies that match a run context;
    executing a data collection strategy based on a first context match in the list; and
    executing a data collection plan based on the data collection strategy.

7. The method as claimed in claim 6, wherein the executing of a data collection plan comprises:
    executing a sensor plan, a data preprocessing plan, and a judgment plan based on the data collection strategy.

8. The method as claimed in claim 6, wherein the executing of a data collection plan comprises:
    receiving a start event, wherein the start event causes current context data to be determined;
    collecting the raw data using at least one sensor;
    storing the raw data in a raw data collection file; and
    receiving an end event, wherein the at least one sensor is stopped and the raw data collection file is closed when the end event occurs.

9. The method as claimed in claim 1, wherein the synchronizing of the raw data with the trace file data and process log file data to create wafer data comprises indexing the raw data from at least one sensor into at least one table using a start event and runtime steps.

10. The method as claimed in claim 1, wherein the collecting of raw data comprises:
    executing a data collection plan and data preprocessing plan;
    initializing a plurality of sensors using a sensor setup plan;

determining a time synchronization definition for indexing data;
starting a sensor, wherein the sensor comprises at least one of a process tool, a process module, and a process sensor;
receiving sensor data from the sensor; and
storing the sensor data from the sensor in at least one of a raw data collection file, a trace file, and a process log file using the time synchronization definition.

11. The method as claimed in claim 10, further comprising:
stopping the sensor;
transmitting the sensor data from the sensor to a data collection hub; and
processing the sensor data in the hub.

12. The method as claimed in claim 11, wherein the processing of the data in the hub further comprises:
calculating custom parameters; and
filtering raw sensor data using the custom parameters.

13. The method as claimed in claim 12, wherein the filtering of the raw sensor data in the hub further comprises:
trimming the raw sensor data for a process step;
clipping the raw sensor data; and
counting spike limits.

14. The method as claimed in claim 10, further comprising:
processing the sensor data; and
displaying at least some of the processed sensor data.

15. The method as claimed in claim 14, wherein the displaying of at least some of the processed sensor data further comprises:
creating a trace wafer chart; and
displaying the trace wafer chart using a GUI screen.

16. The method as claimed in claim 14, wherein the displaying of at least some of the processed sensor data further comprises:
creating a summary wafer chart; and
displaying the summary wafer chart using a GUI screen.

17. The method as claimed in claim 14, wherein the displaying of at least some of the processed sensor data further comprises:
creating a trace wafer step comparison chart; and
displaying the trace wafer step comparison chart using a GUI screen.

18. The method as claimed in claim 10, further comprising:
using a parameter saving screen to initialize at least one sensor, wherein the parameter saving screen comprises a list of parameters for a selected sensor instance in a selected data collection plan and means for saving at least one parameter.

19. The method as claimed in claim 18, wherein the parameter saving screen comprises a multi-level navigation tree for a cluster tool including a tool level, a module level, a strategy level, and a plan level.

20. The method as claimed in claim 19, wherein the multi-level navigation tree for the cluster tool comprises at least one English language multi-level navigation tree, and at least one of a Japanese language multi-level navigation tree, a Taiwanese language multi-level navigation tree, a Chinese language multi-level navigation tree, a Korean language multi-level navigation tree, a German language multi-level navigation tree, and a French language multi-level navigation tree.

21. The method as claimed in claim 1, further comprising:
creating system configuration data for a cluster tool; and
displaying the system configuration data using a system configuration screen.

22. The method as claimed in claim 21, wherein the system configuration screen comprises a title panel, an information panel, and a navigation panel for the cluster tool.

23. The method as claimed in claim 1, wherein the method comprises providing at least one English language screen, and at least one of a Japanese language screen, a Taiwanese language screen, a Chinese language screen, a Korean language screen, a German language screen, and a French language screen.

* * * * *